United States Patent
Takahashi et al.

(10) Patent No.: US 9,829,762 B2
(45) Date of Patent: Nov. 28, 2017

(54) ELECTROCHROMIC DISPLAY ELEMENT, DISPLAY DEVICE, INFORMATION SYSTEM, AND ELECTROCHROMIC DIMMING LENS

(71) Applicants: Hiroyuki Takahashi, Kanagawa (JP); Tamotsu Horiuchi, Shizuoka (JP); Tohru Yashiro, Kanagawa (JP); Keiichiroh Yutani, Kanagawa (JP); Yoshinori Okada, Kanagawa (JP); Sukchan Kim, Kanagawa (JP); Koh Fujimura, Tokyo (JP); Yoshihisa Naijo, Kanagawa (JP); Kazuaki Tsuji, Kanagawa (JP); Shigenobu Hirano, Kanagawa (JP); Toshiya Sagisaka, Kanagawa (JP); Mamiko Inoue, Tokyo (JP); Satoshi Yamamoto, Kanagawa (JP); Daisuke Goto, Kanagawa (JP)

(72) Inventors: Hiroyuki Takahashi, Kanagawa (JP); Tamotsu Horiuchi, Shizuoka (JP); Tohru Yashiro, Kanagawa (JP); Keiichiroh Yutani, Kanagawa (JP); Yoshinori Okada, Kanagawa (JP); Sukchan Kim, Kanagawa (JP); Koh Fujimura, Tokyo (JP); Yoshihisa Naijo, Kanagawa (JP); Kazuaki Tsuji, Kanagawa (JP); Shigenobu Hirano, Kanagawa (JP); Toshiya Sagisaka, Kanagawa (JP); Mamiko Inoue, Tokyo (JP); Satoshi Yamamoto, Kanagawa (JP); Daisuke Goto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 20 days.

(21) Appl. No.: 14/704,345

(22) Filed: May 5, 2015

(65) Prior Publication Data
US 2015/0331295 A1 Nov. 19, 2015

(30) Foreign Application Priority Data

May 13, 2014 (JP) .................................. 2014-099540

(51) Int. Cl.
*G02F 1/153* (2006.01)
*G02F 1/15* (2006.01)
(Continued)

(52) U.S. Cl.
CPC .......... *G02F 1/1523* (2013.01); *G02F 1/1347* (2013.01); *G02F 1/155* (2013.01);
(Continued)

(58) Field of Classification Search
CPC .......... G02F 1/1347; G02F 1/161; G02F 1/15; G02F 1/1525; G02F 1/1527;
(Continued)

(56) References Cited

U.S. PATENT DOCUMENTS 6,213,602 B1 * 4/2001 Smarto ............. B32B 17/10486
351/159.03
7,029,833 B2 4/2006 Takahashi et al.
(Continued)

FOREIGN PATENT DOCUMENTS

JP 2003-121883 4/2003
JP 2006-106669 4/2006
(Continued)

*Primary Examiner* — Ricky Mack
*Assistant Examiner* — Daniele Manikeu
(74) *Attorney, Agent, or Firm* — Cooper & Dunham LLP

(57) ABSTRACT

To provide an electrochromic display element, which contains: a display substrate; a display electrode; an electrochromic layer provided in contact with the display electrode; a counter substrate provided to face the display substrate; a counter electrode; a charge retention layer provided in contact with the counter electrode; and an electrolyte layer filling between the display substrate and the counter sub-
(Continued)

strate, wherein the electrochromic layer contains titanium oxide particles, and metal hydroxide is dispersed on surfaces and in inner parts of the titanium oxide particles.

10 Claims, 5 Drawing Sheets

(51) Int. Cl.
*G02F 1/155* (2006.01)
*G02F 1/1347* (2006.01)

(52) U.S. Cl.
CPC .......... *G02F 1/1533* (2013.01); *G02F 1/1527* (2013.01); *G02F 2001/1536* (2013.01); *G02F 2001/1555* (2013.01)

(58) Field of Classification Search
CPC ..... G02F 2001/1676; G02F 2001/1678; G02F 2001/15
USPC .................................................. 359/265–296
See application file for complete search history.

(56) References Cited

U.S. PATENT DOCUMENTS

| | | |
|---|---|---|
| 7,333,259 B2 | 2/2008 | Hirano et al. |
| 7,474,322 B2 | 1/2009 | Takahashi et al. |
| 8,531,754 B2 | 9/2013 | Fujimura et al. |
| 8,575,365 B2 | 11/2013 | Sagisaka et al. |
| 8,937,758 B2 | 1/2015 | Kim et al. |
| 2005/0175796 A1* | 8/2005 | Nakamura ............ G02B 1/105 428/32.8 |
| 2006/0204866 A1 | 9/2006 | Hirano et al. |
| 2007/0139756 A1* | 6/2007 | Agrawal ................ G02F 1/15 359/265 |
| 2008/0013152 A1 | 1/2008 | Hirano et al. |
| 2009/0231663 A1 | 9/2009 | Hirano et al. |
| 2010/0045591 A1* | 2/2010 | Murata ................ G02F 1/167 345/107 |
| 2010/0097684 A1* | 4/2010 | Ono ...................... G02F 1/1506 359/270 |
| 2010/0134865 A1* | 6/2010 | Higuchi .............. G02F 1/1521 359/273 |
| 2012/0050838 A1 | 3/2012 | Hirano et al. |
| 2012/0119195 A1 | 5/2012 | Sagisaka et al. |
| 2012/0139824 A1 | 6/2012 | Takahashi et al. |
| 2012/0262785 A1* | 10/2012 | Inoue .................... G02B 1/111 359/488.01 |
| 2014/0024841 A1 | 1/2014 | Sagisaka et al. |
| 2014/0104675 A1* | 4/2014 | Morikawa ............ G02F 1/167 359/296 |

FOREIGN PATENT DOCUMENTS

| | | |
|---|---|---|
| JP | 2010-033016 | 2/2010 |
| JP | 2010-271561 | 12/2010 |
| JP | 2011-128200 | 6/2011 |
| JP | 2012-137736 | 7/2012 |
| JP | 2013-186179 | 9/2013 |
| JP | 2015-014743 | 1/2015 |
| JP | 2015-028580 | 2/2015 |

\* cited by examiner

ELECTROCHROMIC DISPLAY ELEMENT, DISPLAY DEVICE, INFORMATION SYSTEM, AND ELECTROCHROMIC DIMMING LENS

BACKGROUND OF THE INVENTION

Field of the Invention

The present invention relates to an electrochromic display element, a display device, information equipment, and an electrochromic dimming lens.

Description of the Related Art

As for an electronic medium replacing paper, developments of electronic paper have been recently actively carried out. Examples of a display element used for the electronic paper include a display element using reflecting liquid crystals, a display element using electrophoresis, a display element using toner migration, and a display element using an electrochromic compound (an electrochromic display element).

The electrochromic display element is a strong candidate for a display element of the next generation, because it has a memory effect, and can be driven at low voltage. Therefore, a wide range of researches and developments have been currently conducted on the electrochromic display element, including a development of a material, and designing of a device.

An electrochromism phenomenon in the electrochromic display element is a reversible phenomenon that the electrochromic compound causes an oxidation/reduction reaction by applying voltage to the electrochromic compound to thereby color or discharge. The electrochromic display element can emit various colors with utilizing the electrochromism, as a result that a structure of the electrochromic compound is changed. Accordingly, there is a high expectation for the electrochromic display element as a display element capable of multicolor display.

As for the aforementioned electrochromic display element, for example, disclosed is an electrochromic element having an organic electrochromic layer, in which a plurality of polymer particle layers are laminated (see Japanese Patent Application Laid-Open (JP-A) No. 2003-121883). Moreover, disclosed is a multicolor display element containing a display layer, which is formed by laminating or mixing a plurality of electrochromic compositions each emitting different colors (see JP-A No. 2006-106669). Furthermore, disclosed is an electrochromic display device, in which a plurality of electrochromic layers corresponding to a plurality of display electrodes are provided (see JP-A No. 2010-33016).

Further, in order to realize practical electronic paper using an electrochromic display element, proposed is an electrochromic display device having excellent display quality without blurring in color and image blur, and having excellent durability, by using a thin film transistor (TFT) as a driving element, and forming a charge retention layer (high resistance layer) as a continuous layer (a solid film) on a pixel electrode (counter electrode) to which a plurality of the TFTs are formed with being apart from each other (see JP-A No. 2012-137736).

Moreover, the electrochromic display element has been considered to apply for a dimming lens, a dimming window, and a glare-proof mirror, other than the electronic paper.

The electrochromic display element used for electronic paper, or a dimming lens is desired to have excellent light fastness in a reflective display system and a transmissive display system. In addition, the electrochromic display element is desired to have the same degree of a white reflectance to that of paper in a reflective display system.

Conventionally, titanium oxide is suitably used in an electrochromic display element. Especially in an electrochromic display element of a reflective display system, titanium oxide particles having high white light scattering properties as a material of a white reflection layer, as well as using the titanium oxide particles as bearing particles of an electrochromic compound so that high white reflectance and high contrast ratio can be maintained.

However, titanium oxide, which is a photocatalystic active material, decomposes an electrochromic compound, and other constituting elements, to thereby reduce light fastness of an electrochromic display element. Use of rutile-type titanium oxide is proposed as the measure for preventing photocatalystic activities of the titanium oxide, but it is difficult to suppress reduction of the light fastness.

In order to inhibit photocatalystic activities of titanium oxide particles used as a material of a white reflection layer, moreover, disclosed is to cover surfaces of the titanium oxide particles with a polymer compound inert to a display medium composition (JP-A No. 2011-128200). However, the disclosed coating of the polymer compound cannot sufficiently suppress photocatalystic activities of the titanium oxide particles. Moreover, there is also a problem that no measure for suppressing the photocatalystic activities is provided on the titanium oxide particles used as bearing particles of the electrochromic compound.

Accordingly, there is a need for an electrochromic display element having excellent light fastness, and excellent coloring-discharging properties in a reflective display system and a transmissive display system, without increasing voltage required for coloring and discharging.

SUMMARY OF THE INVENTION

The present invention aims to provide an electrochromic display element, which has excellent light fastness, and excellent coloring-discharging properties The present invention aims to provide an electrochromic display element having excellent light fastness, and excellent coloring-discharging properties in a reflective display system and a transmissive display system, without increasing voltage required for coloring and discharging.

As the means for solving the aforementioned problems, the electrochromic display element of the present invention contains:

a display substrate;

a display electrode;

an electrochromic layer provided in contact with the display electrode;

a counter substrate provided to face the display substrate;

a counter electrode;

a charge retention layer provided in contact with the counter electrode; and an electrolyte layer filling between the display substrate and the counter substrate, wherein the electrochromic layer contains titanium oxide particles, and metal hydroxide is dispersed on surfaces and in inner parts of the titanium oxide particles.

The present invention can solve the aforementioned various problems in the art, achieve the aforementioned object, and provide an electrochromic display element having excellent light fastness, and excellent coloring-discharging properties in a reflective display system and a transmissive display system, without increasing voltage required for coloring and discharging.

Figure 1:
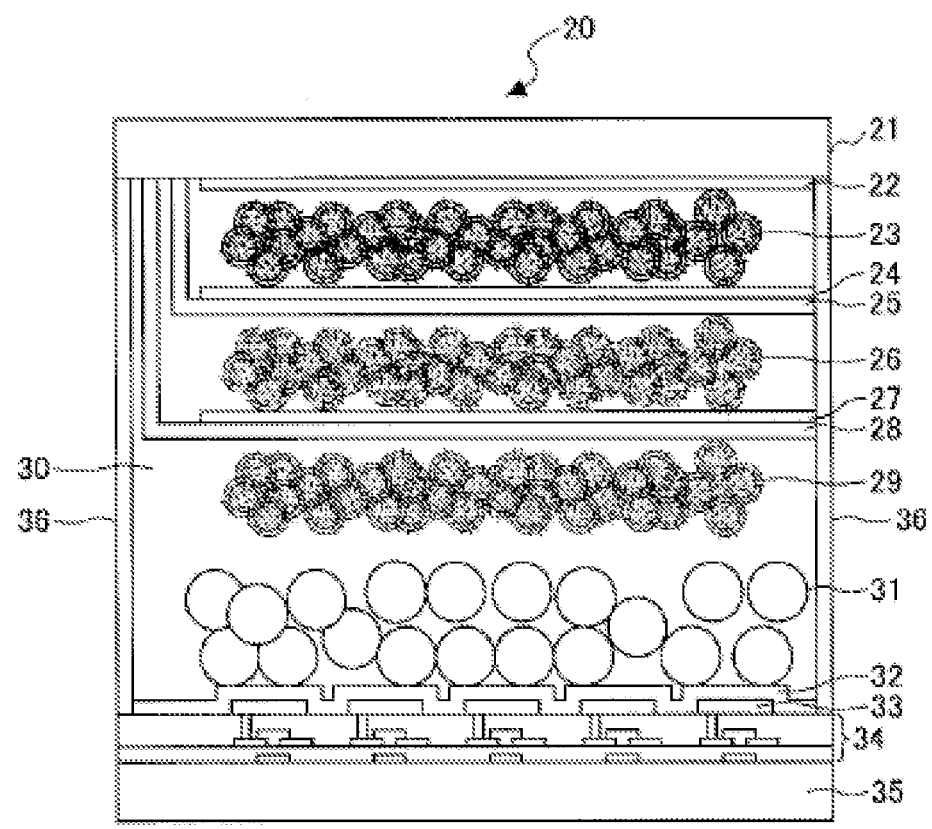
FIG. 1 is a diagram illustrating one example of a structure of the electrochromic display element of the present invention.

DETAILED DESCRIPTION OF THE INVENTION (Electrochromic Display Element)

In a first embodiment, the electrochromic display element contains a display substrate, a display electrode, an electrochromic layer provided in contact with the display electrode, a counter substrate provided to face the display substrate, a counter electrode, a charge retention layer provided in contact with the counter electrode, and an electrolyte layer filling between the display substrate and the counter substrate, in which the electrochromic layer contains titanium oxide particles, and metal oxide is dispersed on surfaces and in inner parts of the titanium oxide particles.

In the electrochromic display element according to the first embodiment, metal hydroxide is dispersed on surfaces and in inner parts of titanium oxide particles contained in the electrochromic layer. As a result of this, an electrochromic display element having excellent light fastness can be realized without significantly increasing the voltage required for coloring and discharging.

In a second embodiment, the electrochromic display element of the present invention contains a display substrate, a display electrode, an electrochromic layer provided in contact with the display electrode, a counter substrate provided to face the display substrate, a counter electrode, a charge retention layer provided in contact with the counter electrode, a white reflection layer provided between the electrochromic layer and the charge retention layer, and an electrolyte layer filling between the display substrate and the counter substrate, in which the electrochromic layer and the white reflection layer both contain titanium oxide particles, and metal oxide is dispersed at surface or in inner parts of the titanium oxide particles.

In the electrochromic display element according to the second embodiment, meal hydroxide is dispersed on surfaces and in inner parts of titanium oxide particles contained in both the electrochromic layer and the white reflection layer. As a result of this, an electrochromic display element having excellent light fastness can be realized without significantly increasing the voltage required for coloring and discharging.

In order to solve the aforementioned problems, the present inventors have previously proposed an electrochromic display element using, as titanium oxide particles used as a material of a white reflection layer and titanium oxide particles used as bearing particles of an electrochromic compound, titanium oxide particles photocatalystic activities of which have been suppressed by covering surfaces of the titanium oxide particles with metal hydroxide (JP-A No. 2015-28580). The proposed electrochromic display element excels in the light fastness thereof. However, it has been found that the electrochromic display element has a side effect that voltage required for coloring and discharging increases. As a result, it is difficult to color and discharge the electrochromic display element, and coloring and discharging properties are degraded.

To solve this problem, the present inventors have diligently conducted further researches. As a result, it has found that an electrochromic display element having excellent light fastness and coloring and discharging properties can be attained without increasing the voltage required for coloring and discharging by dispersing metal hydroxide on surfaces and in inner parts of titanium oxide particles contained both in the electrochromic layer and the white reflection layer.

<Titanium Oxide Particles>

The titanium oxide particles contained in the electrochromic layer and the titanium oxide particles contained in the white reflection layer both contain metal hydroxide dispersed in the inner parts thereof and on the surfaces thereof. As a result of this, the photocatalystic activities of the titanium oxide particles can be suppressed without increasing the voltage required for coloring and discharging.

A reason why photocatalystic activities of titanium oxide particles in inner parts and on surfaces of which metal hydroxide is dispersed can be suppressed in the present invention is assumed as follows. Free radicals (e.g., atoms or molecules having unpaired electrons) generated adjacent to surfaces or inner parts of the titanium oxide particles when light is applied are deactivated (inactivated) as the free radicals pass through domain of the metal hydroxide. The fact that light fastness of the electrochromic display element can be improved by suppressing the photocatalystic activities of the titanium oxide particles can be confirmed by the results of Examples described later.

In the present specification, the phrase "metal hydroxide dispersed in inner parts and on surfaces of the titanium oxide particles" means that the metal hydroxide is dispersed in the inner parts of the titanium oxide particles as well as on the surfaces thereof. It is preferred that the metal hydroxide is homogeneously dispersed on surfaces and in inner parts of the titanium oxide particles. Accordingly, an embodiment where only surfaces of the titanium oxide particles are covered with metal hydroxide is not included.

Whether or not the metal hydroxide is dispersed in the inner parts and on the surfaces of the titanium oxide particles can be confirmed by analyzing the titanium oxide particles using transmission electron microscope (TEM).

The metal hydroxide is appropriately selected depending on the intended purpose without any limitation, provided that it is a material capable of suppressing photocatalystic activities of the titanium oxide particles. Examples thereof include iron(III) hydroxide, and aluminium hydroxide. Among them, aluminium hydroxide is preferable.

The titanium oxide particles on surfaces and in inner parts of which metal hydroxide is dispersed can be produced, for example, adding metal hydroxide (e.g., aluminium hydroxide) as a raw material and processing the metal hydroxide in the following neutralization hydrolysis reaction formula of a titanium salt.

<Neutralization Hydrolysis of Titanium Salt>

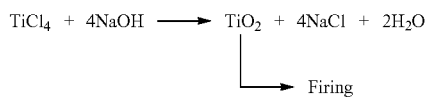

An amount of the metal hydroxide in the titanium oxide particles is preferably 3% by mass to 15% by mass. When the amount of the metal hydroxide is less than 3% by mass, the effect of the titanium oxide to suppress photocatalystic activities may be insufficient. When the amount thereof is greater than 15% by mass, the voltage required for coloring and discharging increases so that it is difficult to color or discharge a resulting electrochromic display element. As a result, a problem may occur, such that durability is impaired when the display element is repeatedly used.

The amount of the metal hydroxide in the titanium oxide particles can be measured, for example, by electron probe micro analyzer (EPMA), inductively coupled plasma mass spectrometry (ICP-MS), or secondary ion mass spectrometry (SIMS).

One example of the electrochromic display element of the present invention is explained with reference to drawings hereinafter.

FIG. 1 is a schematic diagram illustrating one example of a structure of the electrochromic display element 20 of the present invention.

The electrochromic display element 20 contains a display substrate 21, a first display electrode 22, a first electrochromic layer 23, a first insulation layer 24, a second display electrode 25, a second electrochromic layer 26, a second insulation layer 27, a third display electrode 28, a third electrochromic layer 29, an electrolyte layer 30, a white reflection layer 31, a charge retention layer 32, a counter electrode 33, driving element layer 34, a counter substrate 35, and a wall member 36.

As illustrated in FIG. 1, the electrochromic display element 20 contains the white reflection layer 31, and a plurality of the electrochromic layers 23, 26, 29 between two substrates facing each other, and contains the electrolyte layer 30 filling between the substrates. Although it is not illustrated in FIG. 1, metal hydroxide is dispersed in inner parts, and at surface of titanium oxide particles contained in both the electrochromic layer and the white reflection layer.

As for a precise structure at the side of the display substrate 21, the first display electrode 22 is provided to be in contact with the display substrate 21. Moreover, the first electrochromic layer 23 is provided to be in contact with the first display electrode 22. Furthermore, the first insulation layer 24 is provided between the first electrochromic layer 23 and the second display electrode 25. The second electrochromic layer 26 is provided to be in contact with the second display electrode 25. The second insulation layer 27 is provided between the second electrochromic layer 26 and the third display electrode 28. The third electrochromic layer 29 is provided to be in contact with the third display electrode 28.

As for a precise structure at the side of the counter substrate 35, the driving element layer 34 is provided to be in contact with the counter substrate 35. Moreover, the counter electrode 33 is provided to be in contact with the driving element layer 34. The counter electrode 33 is provided to correspond each driving element contained in the driving element layer 34. Furthermore, the charge retention layer 32 is provided to be in contact with the counter electrode 33.

Note that, the white reflection layer 31 may be formed to be in contact with the third electrochromic layer 29, or may be formed to be in contact with the charge retention layer 32.

The display substrate 21 is a substrate for supporting a laminate structure, for example, composed of the first display electrode 22, the first electrochromic layer 23, the first insulation layer 24, the second display electrode 25, the second electrochromic layer 26, the second insulation layer 27, the third display electrode 28, and the third electrochromic layer 29.

A material of the display substrate 21 is appropriately selected depending on the intended purpose without any limitation, provided that it is a material having transparency. Examples thereof include glass, and a plastic film.

The first display electrode 22 is configured to color or discharge the first electrochromic layer 23 with the voltage generated between the first display electrode and the counter electrode 33.

The second display electrode 25 is configured to color or discharge the second electrochromic layer 26 with the voltage generated between the second display electrode and the counter electrode 33. The third display electrode 28 is configured to color or discharge the third electrochromic layer 29 with the voltage generated between the third display electrode and the counter electrode 33.

Coloring of each electrochromic layer is determined with the level of the voltage generated between the counter electrode 33 and each display electrode, and hence a tone of the color of each electrochromic layer is changed by the voltage.

A material of the first display electrode 22, the second display electrode 25, or the third display electrode is appropriately selected depending on the intended purpose without any limitation, provided that it is a conductive material having transparency. Examples thereof include an inorganic material, such as thin-doped indium oxide (referred to as "ITO" hereinafter), fluorine-doped tin oxide (referred to as "FTO" hereinafter), antimony-doped tin oxide (referred to as "ATO" hereinafter), and zinc oxide. Among them, preferred are InSnO, GaZnO, SnO, $In_2O_3$, and ZnO.

Figure 2:
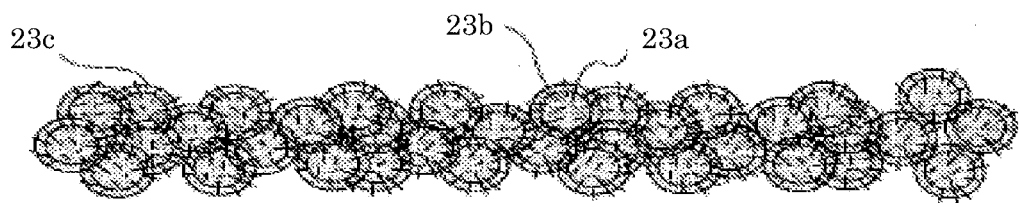
FIG. 2 is a diagram illustrating one example of titanium oxide particles contained in the electrochromic display element of the present invention, in which each titanium oxide particle has a structure where metal hydroxide is dispersed at a surface thereof and in an inner part thereof.

The first electrochromic layer 23 contains an electrochromic compound 23a, titanium oxide particles 23b bearing the electrochromic compound thereon, and metal hydroxide 23c dispersed in inner parts and on surfaces of the titanium oxide particles 23b (see FIG. 2).

Electrons are efficiently injected to the electrochromic compound 23a utilizing a large surface area of the titanium oxide particles 23b, by adsorbing single molecules of the electrochromic compound 23a onto the titanium oxide particles 23b as illustrated in FIG. 2. As a result, color density of the coloring of the electrochromic compound 23a can be increased, and the switching speed between coloring and discharging can be increased.

The electrochromic compound 23a causes an oxidation/reduction reaction with the voltage generated between the first display electrode 22 and the counter electrode 33, to thereby be colored or discharged (reversible reaction).

A length of a single molecule of the electrochromic compound 23a is preferably 5 nm or shorter.

The titanium oxide particles 23b bear the electrochromic compound 23a thereon.

The average particle diameter of the titanium oxide particles 23b is preferably 5 nm to 100 nm, more preferably about 20 nm. The first electrochromic layer 23 can be made a transparent layer by adjusting the average particle diameter of the titanium oxide particles 23b to the range of 5 nm to 100 nm. Specifically, the reflective electrochromic display element can attain high white reflectance when it is not colored. Meanwhile, the transparent electrochromic display element attains a vivid color when it is colored, and attains a colorless transparent state when it is discharged.

The average particle diameter of the titanium oxide particles can be measured, for example, by means of a particle size distribution analyzer using a laser diffraction/scattering method.

The metal hydroxide 23c is dispersed in the inner parts, and on the surfaces of the titanium oxide particles to suppress photocatalystic activities of the titanium oxide particles.

An amount of the metal hydroxide 23c in the titanium oxide particles is preferably 3% by mass to 15% by mass.

In FIG. 1, the titanium oxide particles 23b have a structure where the particles bear one type of the electrochromic compound 23a, but it is possible that the titanium oxide particles 23b bear a plurality of types of the electrochromic compound.

Similarly to the first electrochromic layer 23, each of the second electrochromic layer 26 and the third electrochromic layer 29 contains an electrochromic compound, titanium oxide particles bearing the electrochromic compound, and metal hydroxide dispersed in inner parts and on surfaces of the titanium oxide particles. As a result of this, photocatalystic activities of the titanium oxide can be suppressed. Accordingly, light fastness of the electrochromic display element can be improved by dispersing the metal hydroxide in the inner parts and on surfaces of the titanium oxide particles contained in all electrochromic layers to suppress the photocatalystic activities of the titanium oxide particles.

Note that, FIG. 2 illustrates a structure where a single molecule of the electrochromic compound 23a is adsorbed on the titanium oxide particles 23b as an ideal state, but the structure is not limited thereto, as long as it is a structure where the electrochromic compound 23a is fixed at high density so as not to move. Moreover, the structure is not limited as long as it is a structure where electric connection between the first electrochromic layer 23 and the first display electrode 22 is secured, so as not to prevent accepting and donating electrons due to an oxidation/reduction reaction of the electrochromic compound 23a. Moreover, the electrochromic compound 23a and the titanium oxide particles 23b may be mixed to form a single layer. The descriptions of the structure is the same as in the second electrochromic layer 26 and the third electrochromic layer 29.

Note that, other than the aforementioned titanium oxide particles, an embodiment of a material, which is applied for an electrochromic display element, and realizes a photocatalyst active material that enhances light fastness through dispersing metal hydroxide in inner parts and on surfaces of particles thereof, is also included.

The metal hydroxide is appropriately selected depending on the intended purpose without any limitation, provided that it is a material capable of effectively suppressing photocatalystic activities of the titanium oxide particles. Examples thereof include iron(III) hydroxide, and aluminium hydroxide. Among them, aluminium hydroxide is preferable.

As for a material of the electrochromic compound, for example, a conventional electrochromic compound material, such as a dye-based electrochromic compound, a polymer-based electrochromic compound, a metal complex-based electrochromic compound, and a metal oxide-based electrochromic compound, can be used.

Examples of the dye-based electrochromic compound and the polymer-based electrochromic compound include: a low molecular organic electrochromic compound, such as an azobenzene-based compound, an anthraquinone-based compound, a diarylethene-based compound, a dihydroprene-based compound, a dipyridine-based compound, a styryl-based compound, a styrylspiropyran-based compound, a spirooxazine-based compound, a spirothiopyran-based compound, a thioindigo-based compound, a tetrathiafulvalene-based compound, a telephthalic acid-based compound, a triphenylmethane-based compound, a triphenylamine-based compound, a naphthopyran-based compound, a viologen-based compound, a pyrazoline-based compound, a phenazine-based compound, a phenylenediamine-based compound, a phenoxazine-based compound, a phenothiazine-based compound, a phthalocyanine-based compound, a fluoran-based compound, a fulgide-based compound, a benzopyran-based compound, and a metallocene-based compound; and a conductive polymer compound, such as polyaniline, and polythiophene. These may be used alone, or in combination. Among them, preferred are a viologen-based compound (see, for example, Japanese Patent (JP-B) No. 3955641, and JP-A No. 2007-171781), and a dipyridine-based compound (see, for example, JP-A Nos. 2007-171781 and 2008-116718). By adding the viologen-based compound or the di pyridine-based compound, the electrochromic compound exhibits an excellent color value at the time of coloring and discharging, even with low voltage applied to the display electrode and the counter electrode.

Examples of the metal oxide-based electrochromic compound include tungsten oxide, molybdenum oxide, iridium oxide, indium oxide, titanium oxide, nickel oxide, vanadium oxide, and Prussian blue.

Note that, a material used as an electrochromic compound contained in each electrochromic layer of the electrochromic display element 20 is preferably unified, as that they are all oxidation coloring materials, or all reduction coloring materials.

The first insulation layer 24 isolates the first display electrode 22 to which the first electrochromic layer 23 has been provided from the second display electrode 25 to which the second electrochromic layer 26 has been provided, in order to electrically insulate between the first display electrode and the second display electrode.

The second insulation layer 27 isolates the second display electrode 25 to which the second electrochromic layer 26 has been provided from the third display electrode 28 to which the third electrochromic layer 29 has been provided, in order to electrically insulate between the second display electrode and the third display electrode.

Note that, the first insulation layer 24 may not be provided, if resistance between the first display electrode 22 and the second display electrode 25 can be made large. For example, the resistance between the first display electrode 22 and the second display electrode 25 can be made large by increasing a thickness of the first electrochromic layer 23. Similarly, the second insulation layer 27 may not be provided, if resistance between the second display electrode 25 and the third display electrode 28 can be made large.

Coloring and discharging of each electrochromic layer can be separately controlled by providing the aforementioned insulation layers, and therefore it is possible to realize a highly precise full-color display.

A material of the insulation layer is appropriately selected depending on the intended purpose without any limitation, provided that it is a porous insulator. Examples thereof include a material having high insulating properties and durability, and excellent film formability. Among them, a material containing at least ZnS is preferable, as it can be realize high speed film formation through sputtering. The ZnS is preferable, as it can reduce a damage applied on the electrochromic layer during the film formation.

Examples of the material containing ZnS include ZnS—$SiO_2$, ZnS—SiC, ZnS—Si, and ZnS—Ge.

The counter substrate 35 is a substrate configured to support a laminate structure, for example, composed of the driving element layer 34, the counter electrode 33, and the charge retention layer 32.

A material of the counter substrate 35 is appropriately selected depending on the intended purpose without any limitation, provided that it is a material having transparency. Examples thereof include glass, and a plastic film.

The counter electrode 33 is configured to color or discharge the first electrochromic layer 23, the second electrochromic layer 26, and the third electrochromic layer 29 with the voltage generated between the counter electrode 33 and each display electrode.

A material of the counter electrode 33 is appropriately selected depending on the intended purpose without any limitation, provided that it is a material having electroconductivity. Examples of the conductive material having transparency include an inorganic material, such as ITO, FTO, ATO, and zinc oxide.

The driving element layer 34 contains a plurality of driving elements, and is configured to drive the driving elements according to the selected pixels. Note that, the pixel density and the number of the driving elements are proportional.

The charge retention layer 32 is configured to buffer the transfer of the charge generated by the voltage applied between each display electrode and the counter electrode 33. The coloring/discharging repeating durability of each electrochromic layer can be improved by providing the charge retention layer 32. As the repeating durability is enhanced, a display device using the electrochromic display element enables highly precise display.

As for a material of the charge retention layer 32, a mixed material containing conductor particles or semiconductor particles, and a polymer material.

Examples of the conductor particles include ITO, FTO, and ATO.

Examples of the semiconductor particles include oxides of titanium, zirconium, hafnium, chromium, molybdenum, tungsten, vanadium, niobium, tantalum, silver, zinc, strontium, iron, and nickel.

The polymer material is appropriately selected depending on the intended purpose without any limitation, and examples thereof include an acryl-based polymer, an alkyd-based polymer, a fluoropolymer, an isocyanate-based polymer, a urethane-based polymer, an amino-based polymer, an epoxy-based polymer, and a phenol-based polymer.

Note that, in the case where a material used as an electrochromic compound in each electrochromic layer is all an oxidation coloring material, ATO is particularly preferably used as a particulate material to be mixed with the polymer material. In the case where a material used as an electrochromic compound in each electrochromic layer is all a reduction coloring material, moreover, tungsten oxide is particularly preferably used as a particulate material to be mixed with the polymer material. The driving voltage of the electrochromic display element can be reduced by using ATO in case of the oxidation coloring material, or tungsten oxide in case of the reduction coloring material, to thereby improve the repeating durability.

The wall member 36 surrounds each display electrode, each electrochromic layer, and the white reflection layer 31.

Examples of a material of the wall member 36 include: a UV-ray curable resin material, such as an acrylate-based (radical polymerizable) resin, and an epoxy-based (cation polymerizable) resin; and a thermoset resin, such as an epoxy-based resin, a phenol-based resin, and a melamine-based resin.

The white reflection layer 31 is a layer for improving a white reflectance in the electrochromic display element 20.

The white reflection layer 31 contains titanium oxide particles, and metal hydroxide dispersed in inner parts and on surfaces of the titanium oxide particles.

The average particle diameter of the titanium oxide particles is preferably 200 nm to 3 µm, more preferably about 300 nm.

The average particle diameter of the titanium oxide particles can be measured, for example, by means of a particle size distribution analyzer using a laser diffraction/scattering method.

Photocatalystic activities of the titanium oxide particles can be suppressed by using titanium oxide particles in inner parts and on surfaces of which metal hydroxide is dispersed, as the titanium oxide particles contained in the white reflection layer 31. The experimental results described later demonstrate that the light fastness of the electrochromic display element can be improved by use of the titanium oxide particles in inner parts and on surfaces of which metal hydroxide is dispersed as described above.

The metal hydroxide is appropriately selected depending on the intended purpose without any limitation, provided that it is a material capable of effectively suppressing photocatalystic activities of the titanium oxide particles. Examples thereof include iron(III) hydroxide, and aluminium hydroxide. Among them, aluminium hydroxide is preferable.

The electrolyte layer 30 fills the space formed between the counter substrate 35 and the display substrate 21, the perimeter of which is surrounded with the wall member 36. The electrolyte layer 30 fills the space in the manner that each electrochromic layer is included in the electrolyte layer 30. The electrolyte layer 30 is configured to transfer the charge between the first display electrode 22, second display electrode 25, or third display electrode 28, and the counter electrode 33, to thereby color or discharge the first electrochromic layer 23, the second electrochromic layer 26, or the third electrochromic layer 29.

Examples of a material of the electrolyte layer 30 include: an inorganic ion salt, such as an alkali metal salt, an alkaline earth metal salt; a quaternary ammonium salt; and a supporting electrolyte, such as an acid supporting electrolyte, and alkaline supporting electrolyte.

Specific examples of the material of the electrolyte layer 30 include $LiClO_4$, $LiBF_4$, $LiAsF_6$, $LiPF_6$, $LiCF_3SO_3$, $LiCF_3COO$, $KCl$, $NaCl$, $NaBF_4$, $NaSCN$, $KBF_4$, $Mg(ClO_4)_2$, and $Mg(BF_4)_2$.

As for the material of the electrolyte layer 30, an ionic liquid can be also used. Among them, an organic ionic liquid is preferably used, as the organic ionic liquid has a molecular structure, which is present as a liquid in a wide temperature range including room temperature.

Examples of the cationic component include: imidazole derivatives, such as N,N-dimethylimidazole salt, N,N-methylethylimidazole salt, and N,N-methylpropylimidazole salt; pyridinium derivatives, such as N,N-dimethylpyridinium salt, and N,N-methylpropylpyridinium salt; and aliphatic quaternary ammonium, such as trimethylpropyl ammonium salt, trimethylhexyl ammonium salt, and triethylhexyl ammonium salt.

Moreover, it is preferred that, for example, a compound containing fluorine be used as the anionic component, in view of stability in the atmosphere. Examples thereof include $BF_4-$, $CF_3SO_3-$, $PF_4-$, and $(CF_3SO_2)_2N-$.

As for a material of the electrolyte layer 30, an ionic liquid, in which the cationic component and the anionic component are appropriately combined, is preferably used.

The ionic liquid may be directly dissolved in a photopolymerizable monomer, oligomer, or a liquid crystal material. Note that, in the case a solubility thereof is poor, the ionic liquid is dissolved in a small amount of a solvent, and the resulting solution may be mixed with a photopolymerizable monomer, oligomer, or a liquid crystal material.

Examples of the solvent include propylene carbonate, acetonitrile, γ-butyrolactone, ethylene carbonate, sulfolane, dioxolane, tetrahydrofuran, 2-methyltetrahydrofuran, dimethyl sulfoxide, dimethoxy ethane, ethoxymethoxy ethane, polyethylene glycol, and alcohol.

The protective layer may be provided to be in contact with each of the first electrochromic layer 23 and the second electrochromic layer 26, at a surfaces thereof opposite to the surface at which the display substrate 21 is provided. By providing the protective layer, adhesion of each of the first electrochromic layer 23 and the second electrochromic layer 26 to an adjacent layer (e.g., the first insulation layer 24, and the second insulation layer 27), and a solubility resistance thereof to a solvent can be improved, to thereby improve a durability of the resulting electrochromic display element 20.

As for a material of the protective layer, an organic polymer material is preferably used. Examples of the organic polymer material include a typical resin, such as polyvinyl alcohol, poly-N-vinyl amide, polyester, polystyrene, and polypropylene.

By providing an inorganic protective layer between the third electrochromic layer 29 and the electrolyte layer 30, moreover, a solubility resistance or corrosion resistance of the third electrochromic layer 29 to the electrolyte layer 30 can be improved, to thereby improve a durability of the resulting electrochromic display element 20.

Note that, the electrochromic display element 20 illustrated in FIG. 1 contains three electrochromic layers, i.e., the first electrochromic layer 23, the second electrochromic layer 26, and the third electrochromic layer 29, but the electrochromic display element 20 is appropriately selected depending on the intended purpose without any limitation.

Figure 3:
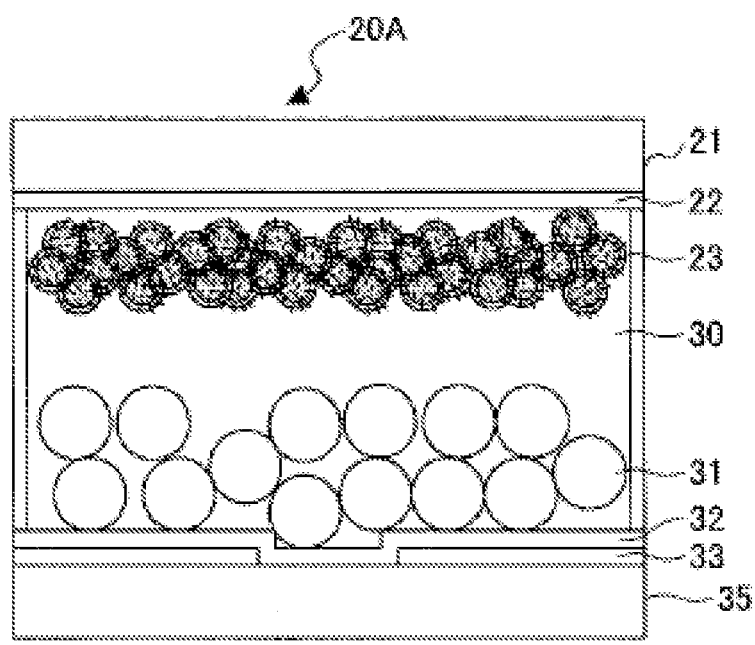
FIG. 3 is a diagram illustrating another example of a structure of the electrochromic display element of the present invention.

In case of a monochrome image display, not full-color image display, only one electrochromic layer may be provided, as in the electrochromic display element 20A illustrated in FIG. 3.

The electrochromic display element 20 can enhance light fastness thereof in any of a reflective display system or a transmissive display system, as photocatalystic activities of titanium oxide particles are suppressed by using the titanium oxide particles, in inner parts and on surfaces of which metal hydroxide is dispersed, as bearing particles for an electrochromic compound. Moreover, the electrochromic display element 20 can enhance a white reflectance in a reflective display system, by using titanium oxide particles, in inner parts and on surfaces of which metal hydroxide is dispersed, as a material of the white reflection layer.

<Multi-Color Display of Electrochromic Display Element>

Next, a multi-color display of the electrochromic display element is explained.

The electrochromic display element 20 illustrated in FIG. 1 can easily realize a multi-color display, as the electrochromic display element 20 has the aforementioned structure.

In the electrochromic display element 20, the first electrochromic layer 23 colors in cyan, the second electrochromic layer 26 colors in magenta, and the third electrochromic layer 29 colors in yellow.

As the first display element 22 and the second display element 25 are provided being apart from each other with the first insulation layer 24 being between them, the electrochromic display element 20 can separately control the voltage generated between the counter electrode 33 and the first display electrode 22, and the voltage generated between the counter electrode 33 and the second display electrode 25.

As the second display electrode 25 and the third display electrode 28 are provided being apart from each other with the second insulation layer 27 being between them, moreover, the electrochromic display element 20 can separately control the voltage generated between the counter electrode 33 and the second display electrode 25, and the voltage between the counter electrode 33 and the third display electrode 28.

In other words, the electrochromic display element 20 can separately color or discharge the first electrochromic layer 23 provided in contact with the first display electrode 22, the second electrochromic layer 26 provided in contact with the second display electrode 25, and the third electrochromic layer 29 provided in contact with the third display electrode 28.

As a result, the electrochromic display element 20 can color or discharge each electrochromic layer in the predetermined color based on the voltage applied to the counter electrode and each display electrode. For example, the electrochromic display element can arbitrary color in a multi-color pattern of the multi-step, such as coloring only the first electrochromic layer 23, coloring only the second electrochromic layer 26, and coloring only the first electrochromic layer 23 and the third electrochromic layer 29. Moreover, the color, color density, and brightness of each electrochromic layer can be arbitrary controlled based on the voltage applied the counter electrode and each display element, to thereby perform a multi-color display in the desired manner.

Note that, the electrochromic display element 20, the color emitted from the first electrochromic layer 23 is not limited to cyan, the color emitted from the second electrochromic layer 26 is not limited to magenta, and the color emitted from the third electrochromic layer 29 is not limited to yellow.

As the electrochromic display element 20 uses titanium oxide as bearing particles for an electrochromic compound, which are contained in each electrochromic layer, a multi-color display excellent in a response speed of coloring or discharging can be realized. As metal hydroxide is dispersed in inner parts and on surfaces of titanium oxide particles contained in each electrochromic layer, moreover, the electrochromic display 20 can maintain excellent light fastness with suppressing the photocatalystic activities of the titanium oxide. As a result, the electrochromic display element 20 can realize a full-color display (multi-color display) excellent in light fastness, with maintaining high preciseness and high contrast.

<Production Method of Electrochromic Display Element>

In the first embodiment, a production method of the electrochromic display element for use in the present invention contains: forming a display electrode on a display substrate; forming an electrochromic layer on the display electrode, where the electrochromic layer contains titanium oxide particles on surfaces and in inner parts of which metal hydroxide is dispersed; forming a counter electrode on a counter substrate; forming a charge retention layer on the counter electrode; and bonding the display substrate and the counter substrate together with an electrolyte layer being between the display substrate and the counter substrate. The production method of the first embodiment may further contain other steps, as necessary.

In the second embodiment, a production method of the electrochromic display element for use in the present invention contains: forming a display element on a display substrate; forming an electrochromic layer on the display element, the electrochromic layer contains titanium oxide particles, on surfaces and in inner parts of which metal hydroxide is dispersed; forming a white reflection layer on the electrochromic layer, where the white reflection layer contains titanium oxide particles, on surfaces and in inner parts of which metal hydroxide is dispersed; forming a driving element layer on a counter substrate; forming a counter electrode on the driving element layer; forming a charge retention layer on the counter electrode; and bonding the display substrate and the counter substrate together with an electrolyte layer being between the display substrate and the counter substrate. The production method of the second embodiment may further contain other steps, as necessary.

In the third embodiment, a production method of the electrochromic display element for use in the present invention contains: forming a first display element on a display substrate; forming a first electrochromic layer on the first display element, where the first electrochromic layer contains titanium oxide particles, on surfaces and in inner parts of which metal hydroxide is dispersed; forming a first insulation layer on the first electrochromic layer; forming a second display electrode on the first insulation layer; forming a second electrochromic layer on the second display electrode, where the second electrochromic layer contains titanium oxide particles, on surfaces and in inner parts of which metal hydroxide is dispersed; forming a second insulation layer on the second electrochromic layer; forming a third display electrode on the second insulation layer; forming a third electrochromic layer on the third display electrode, where the third electrochromic layer contains titanium oxide particles, on surfaces and in inner parts of which metal hydroxide is dispersed; forming a white reflection layer on the third electrochromic layer, where the white reflection layer contains titanium oxide particles, on surfaces and in inner parts of which metal hydroxide is dispersed; forming a driving element layer on a counter substrate; forming a counter electrode on the driving element layer; forming a charge retention layer on the counter electrode; and bonding the display substrate and the counter substrate together with an electrolyte layer being between the display substrate and the counter substrate. The production method of the third embodiment may further contain other steps, as necessary.

One example of the production method of the electrochromic display element 20 is explained with reference to FIG. 4, hereinafter.

Figure 4:
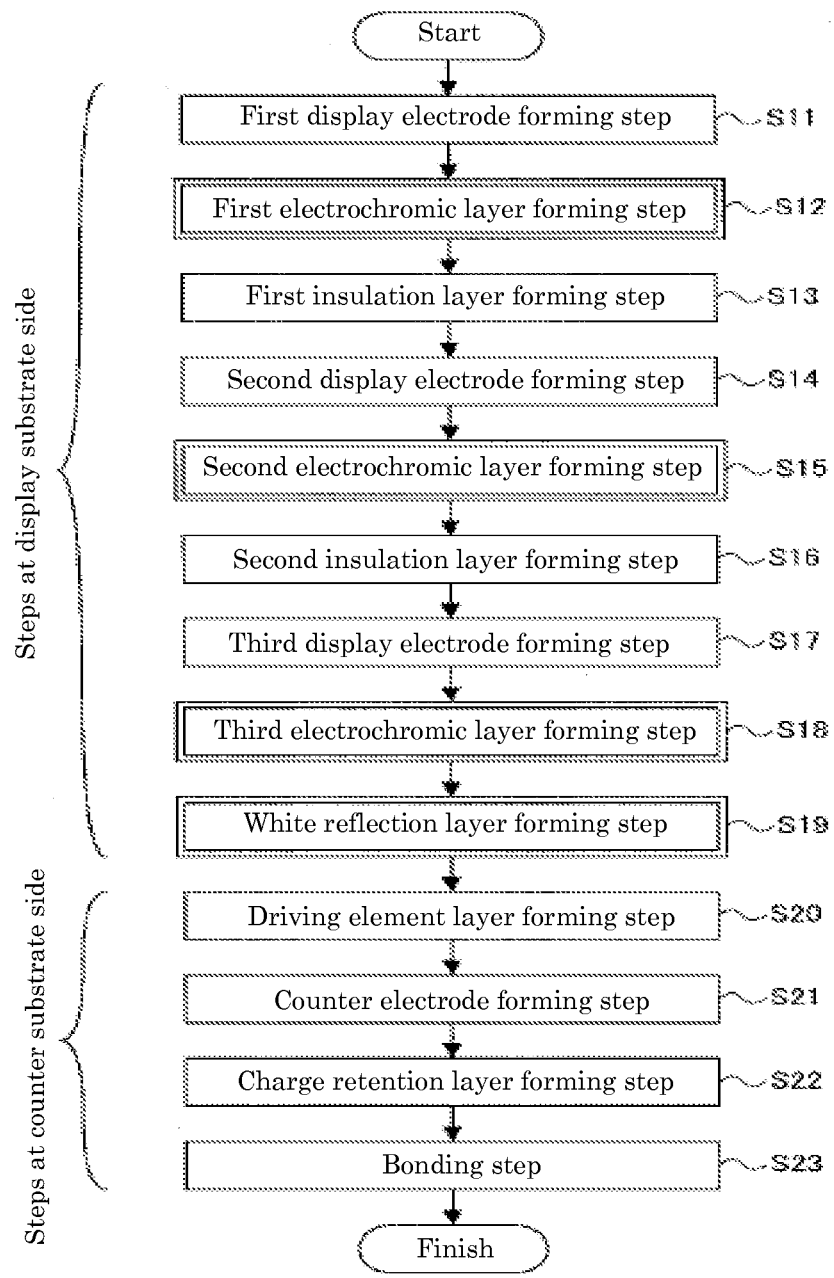
FIG. 4 is a diagram explaining one example of a production method of the electrochromic display element of the present invention.

As depicted with Step S11 to Step S23 of FIG. 4, the production method of the electrochromic display element 20 contains: a first display electrode forming step (Step S11) containing forming a first display electrode 22 on a display substrate 21; a first electrochromic layer forming step (Step S12) containing forming a first electrochromic layer 23 on the first display electrode; a first insulation layer forming step (Step S13) containing forming a first insulation layer 24 on the first electrochromic layer; a second display electrode forming step (Step S14) containing forming a second display electrode 25 on the first insulation layer; a second electrochromic layer forming step (Step S15) containing forming a second electrochromic layer 26 on the second display electrode; a second insulation layer forming step (Step S16) containing forming a second insulation layer 27 on the second electrochromic layer; a third display electrode forming step (Step S17) containing forming a third display electrode 28 on the second insulation layer; a third electrochromic layer forming step (Step S18) containing forming a third electrochromic layer 29 on the third display electrode; a white reflection layer forming step (Step S19) containing forming a white reflection layer 31 on the third electrochromic layer; a driving element layer forming step (Step S20) containing forming a driving element layer 34 on a counter substrate 35; a counter electrode forming step (Step S21) containing forming a counter electrode 33 on the driving element layer; a charge retention layer forming step (Step S22) containing forming a charge retention layer 32 on the counter electrode; and a bonding step (Step S23) containing bonding the display substrate 21 and the counter substrate 35 together.

<First Display Electrode Forming Step>

First, the first display electrode forming step, depicted with Step S11 of FIG. 4, is performed.

On the display substrate 21 (e.g., a glass substrate in the size of 40 mm [length]×40 mm [width]), an ITO film having a thickness of about 100 nm and surface resistance of about 200 $\Omega$/sq. is formed by sputtering, to thereby form a first display electrode 22.

The film formation method is not limited to sputtering, and other vacuum film formation methods, such as ion plating, can be applied.

<First Electrochromic Layer Forming Step>

Next, the first electrochromic layer forming step depicted with Step S12 of FIG. 4 is performed.

First, a dispersion liquid of titanium oxide particles, in inner parts and on surfaces of which metal hydroxide is dispersed, is applied onto the first display electrode 22 by spin coating. Thereafter, annealing is performed at 120° C. for 15 minutes to partially bond the first display electrode 22 with the titanium oxide particles, and to partially bond the titanium oxide particles to each other. As a result, a titanium oxide particle film containing the titanium oxide particles, in the inner parts and on the surfaces of which metal hydroxide is dispersed, is formed.

A ratio of the metal oxide (e.g., aluminum hydroxide) in the titanium oxide particles is 7.7% by mass. Moreover, the average particle diameter of the titanium oxide particles is 20 nm.

Thereafter, a 2,2,3,3-tetrafluoropropanol (referred to as "TFP" hereinafter) solution containing 1% by mass of 4,4'-(isooxazole-3,5-diyl)bis(1-(2-phosphonoethyl)pyridinium)bromide as an electrochromic compound is applied onto the titanium oxide particle film by spin coating, followed by performing annealing at 120° C. for 10 minutes. As a result of this, a first electrochromic layer 23 composed of the titanium oxide particle film and the electrochromic compound is formed.

Thereafter, an ethanol solution containing 0.1% by mass of poly-B-vinyl amide, and an aqueous solution containing 0.5% by mass of polyvinyl alcohol are applied onto the first electrochromic layer 23 by spin coating, to thereby form a protective layer.

<First Insulation Layer Forming Step>

Next, the first insulation layer forming step depicted with Step S13 of FIG. 4 is performed.

A ZnS—SiO$_2$ film having a thickness of about 140 nm is formed on the protective layer by sputtering, to thereby form a first insulation layer 24. A composition ratio between ZnS and SiO$_2$ is 8:2.

As for the film formation method, for example, a vacuum film formation method, such as vapor deposition, sputtering, and ion plating, can be used.

<Second Display Electrode Forming Step>

Next, the second display electrode forming step depicted with Step S14 of FIG. 4 is performed.

An ITO film having a thickness of about 100 nm, surface resistance of about 200 Ω/sq. is formed on the first insulation layer 24 by sputtering, to thereby form a second display electrode 25.

<Second Electrochromic Layer Forming Step>

Next, the second electrochromic layer forming step depicted with Step S15 of FIG. 4 is performed.

First, a dispersion liquid of titanium oxide particles, in inner parts and on surfaces of which metal hydroxide is dispersed, is applied onto the second display electrode 25 by spin coating. Thereafter, annealing is performed at 120° C. for 15 minutes to partially bond the second display electrode 25 with the titanium oxide particles, and to partially bond the titanium oxide particles to each other. As a result, a titanium oxide particle film containing the titanium oxide particles, in the inner parts and on the surfaces of which metal hydroxide is dispersed, is formed.

A ratio of the metal oxide (e.g., aluminum hydroxide) in the titanium oxide particles is 7.7% by mass. Moreover, the average particle diameter of the titanium oxide particles is 20 nm.

Thereafter, a TFP solution containing 1% by mass of 4,4'-(1-phenyl-1H-pyrrole-2,5-diyl)bis(1-(4-phosphonomethyl)benzyl)pyridinium)bromide as an electrochromic compound is applied onto the titanium oxide particle film by spin coating, followed by performing annealing at 120° C. for 10 minutes. As a result of this, a second electrochromic layer 26 composed of the titanium oxide particle film and the electrochromic compound is formed.

Thereafter, an ethanol solution containing 0.1% by mass of poly-B-vinyl amide, and an aqueous solution containing 0.5% by mass of polyvinyl alcohol are applied onto the second electrochromic layer 26 by spin coating, to thereby form a protective layer.

<Second Insulation Layer Forming Step>

Next, the second insulation layer forming step depicted with Step S16 of FIG. 4 is performed.

A ZnS—SiO$_2$ film having a thickness of about 140 nm is formed on the protective layer by sputtering, to thereby form a second insulation layer 27. A composition ratio between ZnS and SiO$_2$ is 8:2.

As for the film formation method, for example, a vacuum film formation method, such as vapor deposition, sputtering, and ion plating, can be used.

<Third Display Electrode Forming Step>

Next, the third display electrode forming step depicted with Step S17 of FIG. 4 is performed.

An ITO film having a thickness of about 100 nm and surface resistance of about 200 Ω/sq. is formed on the second insulation layer 27 by sputtering, to thereby form a third display electrode 28.

<Third Electrochromic Layer Forming Step>

Next, the third electrochromic layer forming step depicted with Step S18 of FIG. 4 is performed.

First, a dispersion liquid of titanium oxide particles, in inner parts and on surfaces of which metal hydroxide is dispersed, is applied onto the third display electrode 28. Thereafter, annealing is performed at 120° C. for 15 minutes to partially bond the third display electrode 28 with the titanium oxide particles, and to partially bond the titanium oxide particles to each other. As a result, a titanium oxide particle film containing the titanium oxide particles, in the inner parts and on the surfaces of which metal hydroxide is dispersed, is formed.

A ratio of the metal oxide (e.g., aluminum hydroxide) in the titanium oxide particles is 7.7% by mass. Moreover, the average particle diameter of the titanium oxide particles is 20 nm.

Thereafter, a TFP solution containing 1% by mass of 4,4'-(4,4'-(1,3,4-oxadiazole-2,5-diyl)bis(4,1-phenylene))bis (1-(8-phosphonooctyl)pyridinium)bromide as an electrochromic compound is applied onto the titanium oxide particle film by spin coating, followed by performing annealing at 120° C. for 10 minutes. As a result, a third electrochromic layer 29 composed of the titanium oxide particle film and the electrochromic compound is formed.

<White Reflection Layer Forming Step>

Next, the white reflection layer forming step depicted with Step S19 of FIG. 4 is performed.

First, a TFP dispersion liquid of titanium oxide particles, in inner parts and on surfaces of which metal hydroxide is dispersed, and an aqueous polyurethane resin, is applied onto the third electrochromic layer 29 by spin coating. Thereafter, annealing is performed at 120° C. for 10 minutes. As a result of this, a white reflection layer 31 containing the titanium oxide particles, in the inner parts and on the surfaces of which metal hydroxide is dispersed, is formed.

A ratio of the metal oxide (e.g., aluminum hydroxide) in the titanium oxide particles is 8.5% by mass. Moreover, the average particle diameter of the titanium oxide particles is 300 nm.

Thereafter, the first display electrode 22, the second display electrode 25, the third display electrode 28, the first electrochromic layer 23, the second electrochromic layer 26, the third electrochromic layer 29, and the white reflection layer 31 are surrounded with a wall member 36 (see FIG. 1).

<Driving Element Layer Forming Step>

Next, the driving element layer forming step depicted with Step S20 of FIG. 4 is performed.

In accordance with a conventional method, a driving element layer 34 containing a plurality of driving elements is formed on a glass substrate (40 mm in length×40 mm in width) serving as a counter substrate 35 in a manner that the pixel density is to be 140 ppi (pixels per inch).

<Counter Electrode Forming Step>

Next, the counter electrode forming step depicted with Step S21 of FIG. 4 is performed.

An ITO film having a thickness of about 100 nm is formed on the counter substrate 35 by sputtering. Thereafter, a plurality of counter electrodes 35 are formed to correspond the driving elements contained in the driving element layer 34 through photolithography.

<Charge Retention Layer Forming Step>

Next, the charge retention layer forming step depicted with Step S22 of FIG. 4 is performed.

A charge retention layer 32 is formed by mixing a polymer material and a particulate material, dispersing the mixture in a dispersion medium, and applying the resulting mixed material onto the driving element layer 34 and the counter electrode 33 by spin coating.

Specifically, a TFP dispersion liquid of an aqueous polyurethane resin and ATO particles is applied on the driving element layer 34 and the counter electrode 35 by spin coating. Thereafter, annealing is performed at 120° C. for 15 minutes, to thereby form a charge retention layer 32 having a thickness of about 640 nm, and surface resistance of about 1.0E+06 Ω/sq.

A mass ratio of the aqueous polyurethane resin to ATO is 55% by mass:45% by mass.

As for the coating method, spin coating, blade coating, or other printing methods can be used.

Note that, it is not necessary to selectively apply the TFP solution of the aqueous polyurethane resin and ATO particles only onto the counter electrode 33, and the TFP solution may be applied between the counter electrodes 33 formed corresponding to a plurality of the driving elements contained in the driving element layer 34. As it is not necessary to selectively apply the solution, the formation of the charge retention layer 32 can simplify the production step to reduce the production cost, compared to the case where the charge retention layer 32 is not formed.

<Bonding Step>

Next, the bonding step depicted with Step S23 of FIG. 4 is performed.

The counter substrate 35 to which the layers up to the charge retention layer 32 have been formed (the layers 34, 33, 32 had been formed), and the display substrate 21 to which the layers up to the white reflection layer 31 have been formed (the layers 22, 23, 24, 25, 26, 27, 28, 29, 31 had been formed) are bonded to together with an electrolyte being between them in the manner that the counter electrode and the display electrode faced each other.

Specifically, a precursor material of the electrolyte is injected from the upper part of the white reflection layer 31 into the display substrate 21 surrounded with the wall member 36. Subsequently, the injection port is sealed, to thereby bond the display substrate 21 with the counter substrate 35. Thereafter, UV light is applied for 2 minutes by a high pressure mercury lamp from the side of the counter electrode 33. As a phase separation of the precursor material can be caused through photopolymerization by the UV light irradiation, so that an electrolyte layer 30 can be formed between the both substrates. Note that, the UV light has a center wavelength of 365 nm, and intensity of 50 mW/cm$^2$.

The precursor material of the electrolyte layer 30 is prepared before the production of the electrochromic display element 20. In the bonding step of Step S23, the precursor material of the electrolyte layer 30 prepared in advance is used. As for one example of the preparation method of the precursor material of the electrolyte layer 30, first, a propylene carbonate solution of tetrabutyl ammonium perchlorate (TBAP) is prepared to have the TBAP molar concentration of about 2.0 mol/l. Subsequently, a mixture containing a liquid crystal composition for polymer network liquid crystal (PNLC), a monomer composition, and a polymerization initiator is added to the resulting solution. Thereafter, the TBAP molar concentration of the propylene carbonate solution is again adjusted to be about 0.04 mol/l. Subsequently, spherical resin beads having particle diameters of 10 μm are dispersed in the propylene carbonate solution at the concentration of 0.2% by mass in order to specify a thickness of an electrolyte layer 30 to be produced. In this manner, the precursor material of the electrolyte layer 30 is prepared.

(Display Device)

The display device of the present invention contains the electrochromic display element of the present invention, VRAM (a first memory unit) storing display data, and a display controller configured to control the electrochromic display element according to the display data, and may further contain other units, as necessary.

(Information System)

The information equipment of the present invention contains the display device of the present invention, and a controlling device configured to control information to be displayed on the display device, and may further contain other units, as necessary.

A case where the electrochromic display element of the present invention is applied for an e-book reader is explained hereinafter.

Note that, the application of the electrochromic display element is not limited to the e-book reader, and the electrochromic display element can be applied to any information equipment equipped with a display device, such as digital signage, a mobile computer, and a portable terminal.

Figure 5:
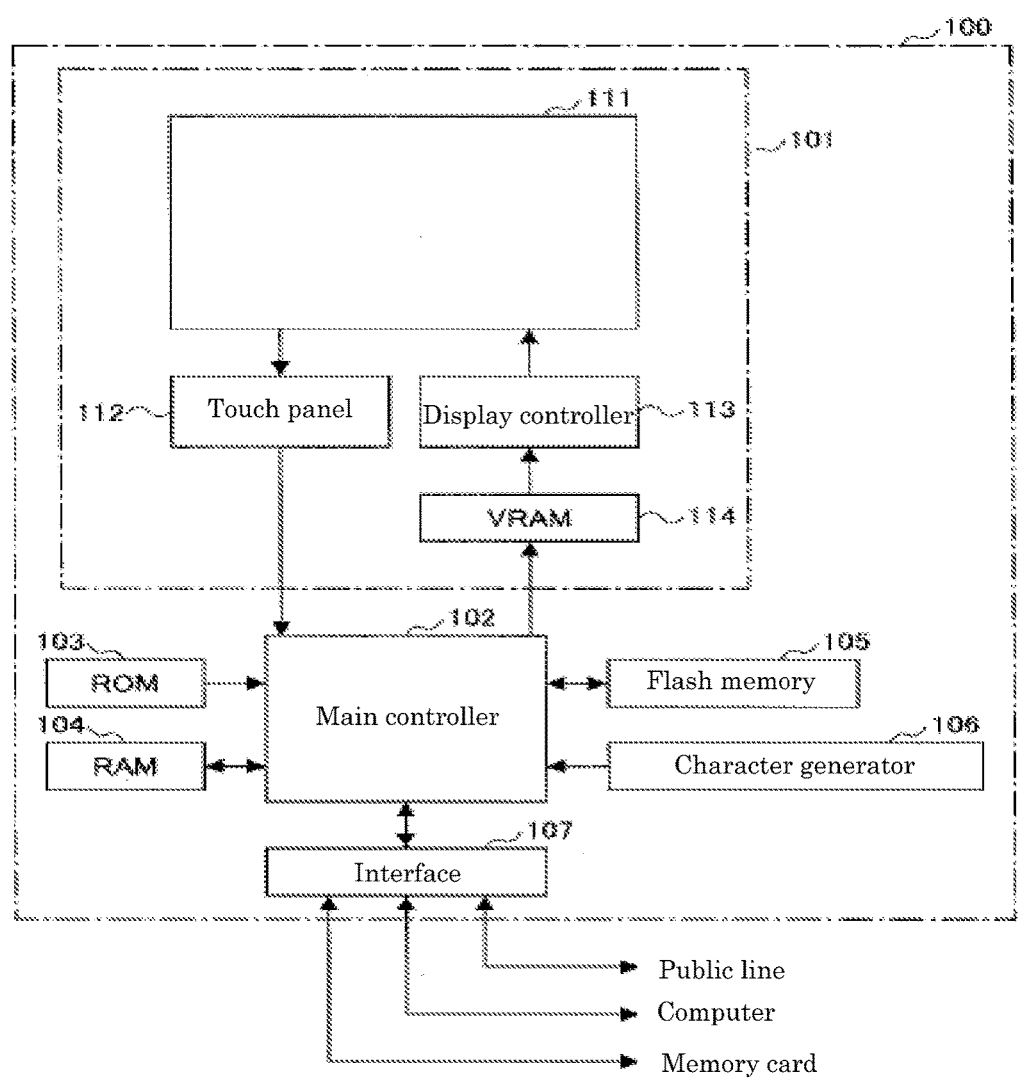
FIG. 5 is a diagram illustrating one example of a structure of the information equipment of the present invention.

FIG. 5 illustrates one example of a schematic structure of the e-book reader 100.

The e-book reader 100 contains a display device 101, main controller 102, a ROM (second memory unit) 103, a RAM (third memory unit) 104, a flash memory (fourth memory unit) 105, a character generator 106, and an interface 107. Moreover, the display device 101 contains a display panel 111 with a touch panel, a touch panel driver 112, a display controller 113, and a VRAM (first memory unit) 114.

Note that, in the structure illustrated in FIG. 5, the character generator 106 is provided outside the display device 101, but the character generator 106 may be provided inside the display device 101. Moreover, the display panel 111 may not be equipped with a touch panel. In the case where there is another input means, such the input means can be provided to the display panel 111. In the case where the display panel 111 is not equipped with a touch panel, it is not necessary to provide a touch panel driver 112.

Note that, the arrows depicted in FIG. 5 represent a flow of typical signals or information, and do not represent the entire connection relationship of all the blocks.

The display panel 111 with the touch panel contains the electrochromic display element 20 of the first embodiment, and a driving circuit configured to individually drive a first electrochromic layer 23, a second electrochromic layer 26, and a third electrochromic layer 29. The driving circuit contains a driving element layer 34. The driving element layer 34 contains a plurality of driving elements corresponding to respective counter electrodes 33. The display panel 111 configured to drive the driving elements corresponding to the selected pixels based on a pixel selecting signal output from the display controller 113, and apply the predetermined voltage to the selected pixels. Note that, the pixel selecting signal is a signal designating pixels to be selected with positions of longitudinal direction, and positions of lateral direction. Moreover, the display panel 111 configured to apply the predetermined voltage to the respective display electrode based on the color specifying signal output from the display controller 113, according to the designated color. The display panel 111 is configured to display a moving image or a still image based on signals, such as the pixel selecting signal, and the color specifying signal.

As a user touches the touch panel, the display panel 111 output a signal based on the touched position to the touch panel driver 112.

Note that, the display panel 111 can realize a highly precise full-color display (multi-color display) with maintaining a high white reflectance and high contrast ratio, as the display panel 111 is equipped with the electrochromic display element 20 of the present invention. Actually, the displayed state of the image was not significantly changed even after repeating a display of a full-color image and discharging alternately 1,000 times.

Moreover, the display panel 111 can switch between coloring and discharging at high speed. The time required for attaining an image from a starting point of driving, and the time required for erasing the image were actually measured. The time required for coloring or discharging was about 500 msec.

As the display panel 111 has excellent light fastness, moreover, the display panel 111 has high resistance to light, and an image display having high visibility can be maintained, even when light is applied thereto for a long period. The display panel 111 was actually left to stand for about 30 minutes after displaying a full-color image. As a result, there was no change in visibility of an image, and no blur in the image.

The VRAM (first memory unit) 114 is configured to store display data for displaying a moving image or still image on the display panel 111. The display data independently corresponds each of pixels contained in the display panel 111. Accordingly, the display data contains display color information corresponding to each pixel.

The display controller 113 reads out the display data stored in the VRAM (first memory unit) 114 per certain timing, and separately control display colors of the pixels contained in the display panel 111 according to the display data. The display controller 113 is configured to output a pixel selecting signal for specifying a pixel to be colored, and a color specifying signal for specifying a color, to the display panel 111.

The touch panel driver 112 is configured to output the position information corresponding to the position on the display panel 111 touched by a user to the main controller 102.

The main controller 102 is configured to collectively control each unit, such as the RAM (third memory unit) 104, the flash memory (fourth memory unit) 105, the character generator 106, the interface 107, and the VRAM (first memory unit) 114, according to the program stored in the ROM (second memory unit) 103.

Once a user turns on the power source, for example, the main controlled 102 reads out the initial menu screen data from the ROM (second memory unit) 103, converts the initial menu screen data into the dot data with reference with the character generator 106, and transfers the dot data to the VRAM (first memory unit) 114. As a result, the initial menu screen is displayed on the display panel 111. At this time, a list of contents stored in the flash memory 105 is displayed on the display panel 111. As one from the menu on the display panel 111 is selected by a user, and the selected display unit part is touched by the user, the main controller 102 obtains the selected item by the user based on the position information from the touch panel driver 112.

In the case where the user specifies the content, and requests to view the content, the main controller 102 reads out electronic data of the content from the flash memory (fourth memory unit) 105, converts the electronic data into dot data with reference to the character generator 106, and transfers the dot data to the VRAM (first memory unit) 114.

In the case where the user requests to buy the content via internet, moreover, main controller 102 connects to a certain online resale site via the interface 107, to function as a normal browser. Once the information from the resale site is displayed on the display panel 111, and the user purchases the content, the electronic data of the content is downloaded. The main controller 102 stores the electronic data of the content in the flash memory (fourth memory unit) 105.

The ROM (second memory unit) 103 is configured to store various programs written with decodable codes by the main controller 102, and various data required for processing the programs.

The RAM (third memory unit) 104 is a memory for processing.

The flash memory (fourth memory unit) 105 is configured to store electronic data of books, which is the contents.

The character generator 106 is configured to store dot data corresponding to various character data.

The interface 107 is configured to control the connection with an external device. The interface 107 can be connected to a memory card, a computer, and a public line. Note that, the connection to a computer and to a public line can be performed both with and without wire.

Since the e-book reader 100 uses the electrochromic display element of the present invention in the touch panel, light fastness, and coloring and discharging properties can be enhanced in both a reflective display system, and a transmissive display system.

(Electrochromic Dimming Lens)

In the first embodiment, the electrochromic dimming lens of the present invention contains a lens, a first electrode layer laminated on the lens, an electrochromic layer laminated on the first electrode layer, a porous insulation layer laminated on the electrochromic layer, a second electrode layer that is porous and laminated on the porous insulation layer, an antidegradation layer provided in contact with the second electrode layer, and provided at an upper side, or a bottom side, or both sides of the second electrode layer, and an electrolyte layer filling between the first electrode layer and the second electrode layer, and provided in contact with the electrochromic layer and the antidegradation layer. The electrochromic dimming lens of the first embodiment may further contain other members, if necessary.

Metal hydroxide is dispersed on surfaces and in inner parts of titanium oxide particles contained in the electrochromic layer.

In the second embodiment, the electrochromic dimming lens of the present invention contains a lens, a first electrode layer laminated on the lens, an antidegradation layer laminated on the first electrode layer, a porous insulation layer laminated on the antidegradation layer, a second electrode layer, which is porous, and is laminated on the porous insulation layer, an electrochromic layer provided in contact with the second electrode layer, and provided at an upper side, or a bottom side, or both sides of the second electrode layer, and an electrolyte layer filling between the first electrode layer and the second electrode layer, and provided in contact with the antidegradation layer and the electrochromic layer. The electrochromic dimming lens of the second embodiment may further contain other members, as necessary.

Metal hydroxide is dispersed on surfaces and in inner parts of titanium oxide particles contained in the electrochromic layer.

Figure 6:
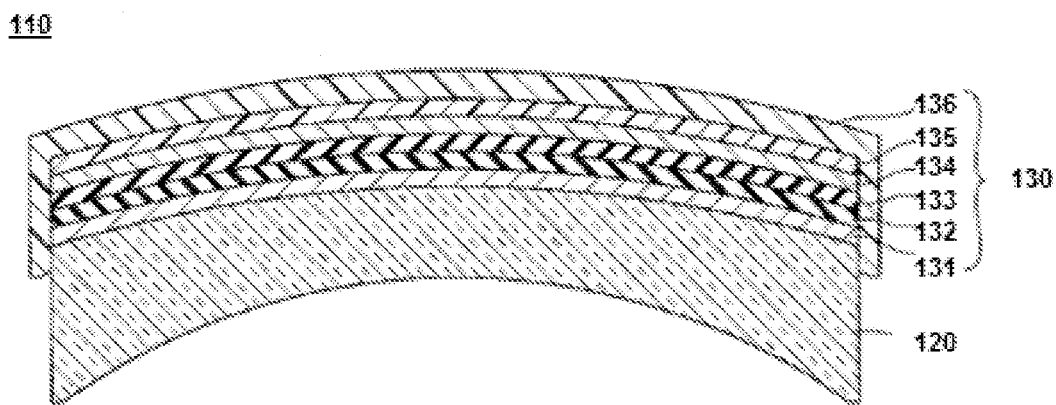
FIG. 6 is a diagram illustrating one example of the electrochromic dimming lens of the present invention.

FIG. 6 is a cross-sectional view illustrating one example of the electrochromic dimming lens of the present invention. With reference to FIG. 6, the electrochromic dimming lens 110 contains a lens 120, and a thin film dimming function unit 130 laminated on the lens 120. A planar shape of the electrochromic dimming lens 110 can be, for example, a round shape.

The thin film dimming function unit 130 has a structure where a first electrode layer 131, an electrochromic layer 132, a porous insulation layer 133, a second electrode layer 134, an antidegradation layer 135, and a protective layer 136 are sequentially laminated, and is a unit configured to color and discolor (dimming) the electrochromic layer 132. Note that, the protective layer 136 is not necessarily formed on each surface of the first electrode layer 131, the electrochromic layer 132, the porous insulation layer 133, the second electrode layer 134, and the antidegradation layer 135, as long as it is formed on a top surface (a surface opposite to the lens 120) of the antidegradation layer 135.

In the electrochromic dimming lens 110, the first electrode layer 131 is provided on the lens 120, and the electrochromic layer 132 is provided to be in contact with the first electrode layer 131.

The second electrode layer 134 is provided on the electrochromic layer 132 to face the first electrode layer 131 via the porous insulation layer 133.

The porous insulation layer 133 is provided to insulate between the first electrode layer 131 and the second electrode layer 134, and the porous insulation layer 133 contains insulating metal oxide particles. The porous insulation layer 133 sandwiched between the first electrode layer 131 and the second electrode layer 134 is filled with an electrolyte (not illustrated).

The second electrode layer 134 is a porous electrode layer, in which numerous through holes piercing through the layer are formed along the thickness direction. The electrochromic layer 135 is formed at the outer side of the second electrode layer 134. The electrochromic layer 135 is also a porous layer, in which numerous through holes piercing through the layer are formed along the thickness direction. The electrochromic layer 135 is also filled with an electrolyte (not illustrated).

The electrochromic dimming lens 110 colors or discharges through an oxidation/reduction reaction due to an exchanges of the charge performed by the electrochromic layer 132, as a voltage is applied between the first electrode layer 131 and the second electrode layer 134.

A production process of the electrochromic dimming lens 110 contains: sequentially forming a first electrode layer 131, and an electrochromic layer 132 on a lens 120; laminating a second electrode layer 134, which is a porous electrode layer in which through holes are formed, on the electrochromic layer 132 in a manner that the second electrode layer 134 faces the first electrode layer 131 via a porous insulation layer 133; forming a porous antidegradation layer 135, in which through holes are formed, on the second electrode layer 134; filling the porous insulation layer 133, which is sandwiched with the first electrode layer 131 and the second electrode layer 134, with an electrolyte from through holes formed in the antidegradation layer 135 and the second electrode layer 134 through the antidegradation layer 135 and the second electrode layer 134; and forming a protective layer 136 on the antidegradation layer 135.

Specifically, the through holes formed each of the antidegradation layer 135 and the second electrode layer 134 are injection ports for filling an electrolyte in the porous insulation layer 133 or the like in the production process of the electrochromic dimming lens 110.

As described above, in the electrochromic dimming lens 110 of the present invention, an electrolyte can fill the porous insulation layer 133 sandwiched with the first electrode layer 131 and the second electrode layer 134 through the through holes formed in the antidegradation layer 135 and the second electrode layer 134. Therefore, it is possible to form a low resistant second electrode layer 134 before filled with the electrolyte, and thus performances of the electrochromic dimming lens 110 can be improved.

As the antidegradation layer 135 is provided on the second electrode layer 134, moreover, the electrochromic dimming lens, which is repeatedly and stably operated, can be realized.

Note that, in the present embodiment, the through holes are formed in the second electrode layer, and thus the antidegradation layer can be formed at the outer side (outer side of the two electrode layers facing each other) of the second electrode layer, in contact with the second electrode layer. This is because ions can move from a front side to a back side of the second electrode layer, or vice versa, through the through holes formed in the second electrode layer. As a result, it is not necessary to form an antidegradation layer below the second electrode layer, and thus a damage applied on the antidegradation layer by sputtering or the like, when the second electrode layer is formed, can be avoided.

In the case where the antidegradation layer, moreover, a process, by which a uniform antidegradation layer can be formed, can be appropriately selected depending on the case when the antidegradation layer is formed on a permeable porous insulation layer, or the case when the antidegradation layer is formed on the second electrode layer. Alternatively, the antidegradation layer may be formed on the both sides of the second electrode layer, as necessary.

In FIG. 6, the electrochromic layer 132 is formed in contact with the first electrode layer 131, and the antidegradation layer 135 is formed in contact with the second electrode layer 134. The electrochromic layer 132 and the antidegradation layer 135 have a relationship that, when an oxidation reaction is carried out in one layer, a reduction reaction is carried out in the other layer, and when a reduction reaction is carried out in one layer, an oxidation reaction is carried out in the other layer. Therefore, the positions for forming these layers may be reversed. Specifically, the antidegradation layer 135 may be formed in contact with the first electrode layer 131, and the electrochromic layer 132 may be formed in contact with the second electrode layer 134.

Moreover, the electrochromic layer 132 may be formed in contact with the first electrode layer 131, and the antidegradation layer may be formed at the both upper and lower sides of the second electrode layer 134 to be in contact with the second electrode layer 134. Furthermore, the antidegradation layer 135 may be formed in contact with the first electrode layer 131, and the electrochromic layer 132 may be formed at the both upper and lower sides of the second electrode layer 134 to be in contact with the second electrode layer 134.

Note that, in the present specification, the antidegradation layer and the electrochromic layer may be each referred to as an electroactive layer. Specifically, in the electrochromic dimming lens 110, the thin film dimming function unit 130 contains a first electrode layer 131 laminated on the lens 120, a first electroactive layer laminated on the first electrode layer 131, a porous insulation layer 133 laminated on the first electroactive layer, a second electrode layer 134, which is porous, laminated on the porous insulation layer 133, and a second electroactive layer, which is porous, and is formed at the upper side, or the bottom side, or both side of the second electrode layer 134, in contact with the second electrode layer 134, where either the first electroactive layer or the second electroactive layer is an electrochromic layer 132, and the other is an antidegradation layer 135.

In the production of the electrochromic dimming lens 110, the protective layer 136 is formed by coating after injecting the electrolyte. Therefore, the resulting electrochromic dimming lens can be made thin in the thickness or light in the weight, compared to the one having a structure where two lenses are bonded, and the cost can also be reduced.

A thickness of the thin film dimming function unit 130 is appropriately selected depending on the intended purpose without any limitation, but the thickness thereof is preferably 2 µm to 200 µm. When the thickness thereof is less than 2 µm, a sufficient dimming faction may not be attained. When the thickness thereof is greater than 200 µm, cracking or flaking of the lens may occur during processing the lens into a round lens, which may adversely affect optical properties of the lens.

<Electrochromic Dimming Spectacles>

Figure 7:
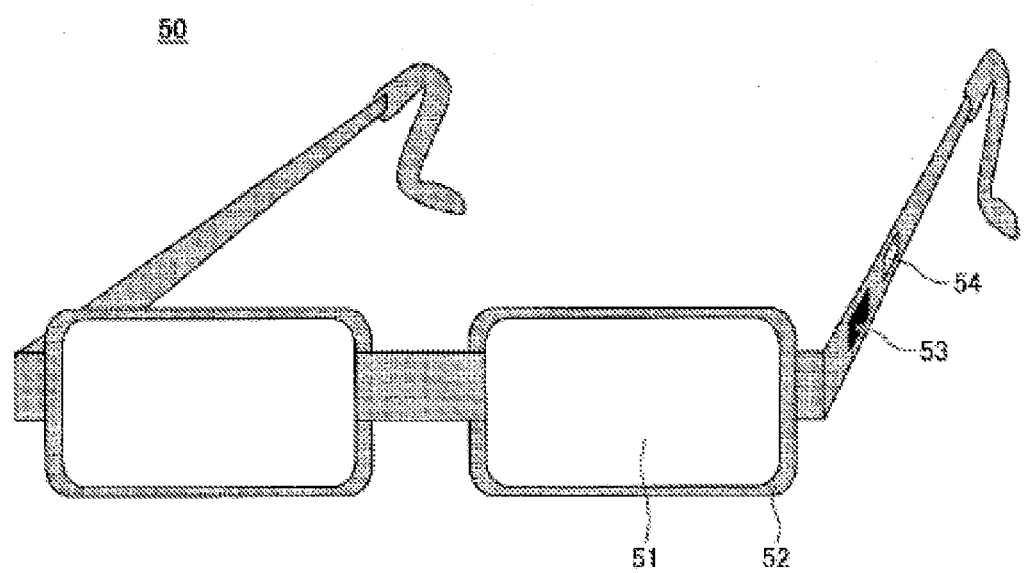
FIG. 7 is a diagram illustrating one example of a structure of spectacles using the electrochromic dimming lenses of the present invention.

FIG. 7 is a perspective view illustrating one example of the electrochromic dimming spectacles according to the present embodiment. With reference to FIG. 7, the electrochromic dimming spectacles 50 contains electrochromic dimming lenses 51, a spectacles frame 52, a switch 53, and a power source 54. The electrochromic dimming lenses 51 are lenses each prepared by processing the electrochromic dimming lens 110 of the present invention into the desired shape.

The two electrochromic dimming lenses 51 are incorporated in the spectacles frame 52. To the spectacles frame 52, the switch 53, and the power source 54 are provided. The power source 54 is electrically connected to the first electrode layer 131 and the second electrode layer 134 with the wiring (not illustrated) via the switch 53.

By using the switch 53, one state can be selected from, for example, a state where a positive voltage is applied between the first electrode layer 131 and the second electrode layer 134, a state where a negative voltage is applied between the first electrode layer 131 and the second electrode layer 134, and a state where no voltage is applied.

As for the switch 53, for example, an arbitrary switch, such as a slide switch, and a push switch, can be used. However, the switch for use is a switch capable of switching between at least the aforementioned three states.

As for the power source 54, an arbitrary DC power source, such as a button battery, and a solar battery, can be used. The power source 54 is capable of apply the voltage of about negative or positive (±) several voltages between the first electrode layer 131 and the second electrode layer 134.

For example, the two electrochromic dimming lenses 51 color in the predetermined color, as a positive voltage is applied between the first electrode layer 131 and the second electrode layer 134. Moreover, the two electrochromic dimming lenses 51 discharge and become transparent, as a negative voltage is applied between the first electrode layer 131 and the second electrode layer 134.

However, there is a case where the electrochromic dimming lenses color, as a negative voltage is applied between the first electrode layer 131 and the second electrode layer 134, and the electrochromic dimming lenses discharge and become transparent, as a positive voltage is applied, because of the properties of the material for use in the electrochromic layer 132. Note that, the colored state is maintained without applying a voltage between the first electrode layer 131 and the second electrode layer 134, once it is colored.

A material of each element constituting the electrochromic dimming lens 110 of the present invention and the film formation method thereof are specifically explained hereinafter.

<Lens>

A material of the lens 120 is appropriately selected depending on the intended purpose without any limitation, provided that it functions as a lens for spectacles. The material thereof is preferably a material having high transparency, being thin in the thickness, and being light weight. Moreover, the material of the lens is preferably a material that has less expansion due to a heat history, and preferably a material having high glass transition temperature Tg, and a material having a small linear expansion coefficient.

As for the material of the lens, specifically, any of materials disclosed in the technical summary publications of Japan Patent Office, associated with a high refractive index glass lens, can be used other than glass. Examples thereof include an episulfide-based resin, a thiourethane-based resin, a methacrylate-based resin, a polycarbonate-based resin, a urethane-based resin, and a mixture thereof. Optionally, a primer may be formed thereon to improve hard coating properties, and adhesion.

In the present specification, the lens includes a lens with which lens power (refractive index) has not been adjusted (i.e., a simple glass plate).

<First Electrode Layer and Second Electrode Layer>

A material of each of the first electrode layer 131 and the second electrode layer 134 is not particularly limited, as long as it is a material having conductivity. In the case where it is used as a dimming glass, it is necessary to secure light transmittance, and thus a transparent conductive material that is transparent and has excellent conductivity is used. Use of such material can enhance a contrast of a color, as well as attaining transparency of the glass.

Examples of the transparent conductive material include an inorganic material, such as ITO, FTO, and ATO. Among them, preferred is indium oxide (referred to as In oxide hereinafter), tin oxide (referred to as Sn oxide hereinafter), or zinc oxide (referred to as Zn oxide hereinafter) formed by vacuum film formation.

The In oxide, Sn oxide, or Zn oxide is a material capable of attaining excellent transparency and electric conductivity, as well as a material that can be easily formed into a film by sputtering. Among them, preferred are InSnO, GaZnO, SnO, $In_2O_3$, and ZnO. More preferred are a transparent network electrode of silver, gold, carbon nanotubes, or metal oxide, and a composite layer thereof. The network electrode is an electrode, to which transmittance is imparted by forming a highly conductive non-transparent material, such as carbon nanotubes or others, into a fine network.

Thicknesses of the first electrode layer 131 and the second electrode layer 134 are adjusted so that the electric resistance value required for an oxidation/reduction reaction of the electrochromic layer 132 is attained.

In the case where ITO is used as materials of the first electrode layer 131 and the second electrode layer 134, for example, thicknesses of the first electrode layer 131 and the second electrode layer 134 are each preferably 50 nm to 500 nm.

Examples of a production method of each of the first electrode layer 131 and the second electrode layer 134 include vacuum vapor deposition, sputtering, and ion plating.

In the case where a material of each of the first electrode layer 131 and the second electrode layer 134 is coatable, examples of the production method thereof include various printing methods, such as spin coating, casting, microgravure coating, gravure coating, bar coating, roller coating, wire bar coating, dip coating, slit coating, capillary coating, spray coating, nozzle coating, gravure printing, screen printing, flexo coating, offset printing, reverse printing, and inkjet printing.

In the present embodiments, numerous fine through holes are formed in the second electrode layer 134 in the thickness direction thereof. For example, the fine through holes can be provided to the second electrode layer 134 in the following method. Specifically, usable is a method where a layer having surface irregularities is formed in advance as an underlying layer, before forming a second electrode layer 134, and a second electrode layer 134 having the surface irregularities as they are is formed.

Another method that may be used is a method where convex-shaped structures, such as micropillars, are formed before forming a second electrode layer 134, and the convex-shaped structures are removed after forming the second electrode layer 134. Yet another method that may be used is a method where foamable high molecular polymer is scattered before forming a second electrode layer 134, and a treatment, such as heating, and degassing, is performed after forming the second electrode layer 134, to foam the second electrode layer. Yet another method that may be used is a method where any of various radial rays are directly applied to the second electrode layer 134 to pours.

Moreover, examples of the method for forming fine through holes in the second electrode layer 34 include colloidal lithography.

The colloidal lithography is a method where fine particles are dispersed on a layer, on which a second electrode layer 134 is laminated, a conductive film, which is to be a second electrode layer 134, is formed on the surface, on which the particles are scattered, by a vacuum film formation using the scattered particles as a mask, and patterning is performed by removing the particles to partially remove the conductive film.

As for a method for forming fine through holes in the second electrode layer 134, other than colloidal lithography, for example, a typical lift-off method using a photoresist, or a dry film can be used. Specifically, it is a method for forming fine through holes in the second electrode layer 134, by forming a desired photoresist pattern first, then forming a second electrode layer 134, and removing the photoresist pattern to remove the unnecessary part of the electrode layer on the photoresist pattern.

In the case where fine through holes are formed in the second electrode layer 134 by a typical lift-off method, a negative photoresist is preferably used in order to avoid a damage cause on the layer below through light irradiation, and reduce the light irradiation area on the target.

Examples of the negative photoresist include polyvinyl cinnamate, styryl pyridinium-formulized polyvinyl alcohol, glycolmethacrylate/polyvinyl alcohol/initiator, polyglycidyl methacrylate, halomethylated polystyrene, a diazo resin, bisazido/diene-based rubber, polyhydroxystyrene/melamine/photoacid generator, a methylated melamine resin, and a methylated urea resin.

Moreover, fine through holes can be formed in the second electrode layer 134 by means of a processing device using laser light.

The diameters of the fine through holes formed in the second electrode layer 134 are preferably 10 nm to 100 µm. When the diameters of the through holes are less than 10 nm (0.01 µm), a problem may be cause, such as poor permeability of electrolyte ions. When the diameters of the finer through holes are greater than 100 µm, they can be recognized with eyes (a size identical to a level of one pixel display in a typical display), and a display performance just above the fine through holes is impaired.

A ratio (pore density) of the pore area of the fine through hole formed in the second electrode layer 134 to a surface area of the second electrode layer 134 can be appropriately set. For example, the ratio is preferably 0.01% to 40%. When the pore density is excessively high, the surface resistance of the second electrode layer 134 is high, and hence a problem may be caused, such as a chromic defect due to an increase area where the second electrode layer 134 is not present. When the pore density is excessively low, on the other hand, permeability of electrolyte ions is poor, which may similarly cause a problem in driving.

<Electrochromic Layer>

The electrochromic layer 132 contains an electrochromic material, titanium oxide particles bearing the electrochromic material, and metal hydroxide dispersed in inner parts and on surfaces of the titanium oxide particles.

An amount of the metal hydroxide in the titanium oxide particles is preferably 3% by mass to 15% by mass.

The metal hydroxide is appropriately selected depending on the intended purpose without any limitation, provided that it is a material capable of inhibiting photocatalystic activities of the titanium oxide particles. Examples thereof include iron(III) hydroxide, and aluminium hydroxide. Among them, aluminium hydroxide is preferable.

As the electrochromic material is born on the titanium oxide particles, electrons can be efficiently injected to the electrochromic material utilizing a large surface area of the titanium oxide particles. Accordingly, the color density of the electrochromic material at the time of coloring can become high, and the switching speed between coloring and discharging can be increased.

The electrochromic material may be an inorganic electrochromic compound, or an organic electrochromic compound.

Moreover, know conductive polymers that exhibit electrochromism can be also used as the electrochromic material.

Examples of the inorganic electrochromic compound include tungsten oxide, molybdenum oxide, iridium oxide, and titanium oxide.

Examples of the organic electrochromic compound include viologen, rare earth phthalocyanine, and styryl.

Examples of the conductive polymer include polypyrrole, polythiophene, polyaniline, and derivatives thereof.

As for the electrochromic material, a polymer-based electrochromic compound or a dye-based electrochromic compound can be used. Examples of the polymer-based electrochromic compound and the dye-based electrochromic compound include: a low molecular organic electrochromic compound, such as an azobenzene-based compound, an anthraquinone-based compound, a diarylethene-based compound, a dihydroprene-based compound, a dipyridine-based compound, a styryl-based compound, a styrylspiropyran-based compound, a spirooxazine-based compound, a spirothiopyran-based compound, a thioindigo-based compound, a tetrathiafulvalene-based compound, a telephthalic acid-based compound, a triphenylmethane-based compound, a triphenylamine-based compound, a naphthopyran-based compound, a viologen-based compound, a pyrazoline-based compound, a phenazine-based compound, a phenylenediamine-based compound, a phenoxazine-based compound, a phenothiazine-based compound, a phthalocyanine-based compound, a fluoran-based compound, a fulgide-based compound, a benzopyran-based compound, and a metallocene-based compound; and a conductive polymer compound, such as polyaniline, and polythiophene. These may be used alone, or in combination.

Among them, preferred are a viologen-based compound, and a dipyridine-based compound, as they have low coloring and discharging voltage, and exhibit excellent color values.

Examples of the viologen-based compound include compounds disclosed in JP-B No. 3955641, and JP-A No. 2007-171781.

Examples of the dipyridine-based compound include compounds disclosed in JP-A Nos. 2007-171781 and 2008-116718.

Among them, a dipyridine-based compound represented by the following general formula 1 is preferable, as it exhibits excellent color value of coloring.

[General Formula 1]

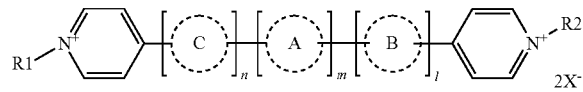

In the general formula 1, R1 and R2 are each independently a substituted or unsubstituted C1-C8 alkyl group, or aryl group, where either R1 or R2, or both have a substituent selected from COOH, PO(OH)$_2$, and Si(OC$_k$H$_{2k+1}$)$_3$ (with proviso that k is an integer of 1 to 20).

In the general formula 1, X is a monovalent anion. The monovalent anion is appropriately selected depending on the intended purpose without any limitation, provided that it stably forms a pair with a cationic site. Examples of the momovalent anion include Br ion (Br$^-$), Cl ion (Cl$^-$), ClO$_4$ ion (ClO$_4^-$), PF$_6$ ion (PF$_6^-$), and BF$_4$ ion (BF$_4^-$).

In the general formula 1, n, m, and l are each 0, 1, or 2. A, B, and C are each independently a substituted or unsubstituted C1-C20 alkyl group, an aryl group, or a heterocyclic group.

Examples of the metal complex-based electrochromic compound and the metal oxide-based electrochromic compound include an inorganic electrochromic compound, such as titanium oxide, vanadium oxide, tungsten oxide, indium oxide, iridium oxide, nickel oxide, and Prussian blue.

A thickness of the electrochromic layer is appropriately selected depending on the intended purpose without any limitation, but the thickness thereof is preferably 0.2 μm to 5.0 μm. When the thickness of the electrochromic layer is less than 0.2 μm, it is difficult to attain a sufficient coloring density. When the thickness thereof is greater than 5.0 μm, a production cost increases, and visibility tends to degrade due to tinting.

The electrochromic layer 7 and the conductive or semiconductive layer can be formed by a vacuum film formation method, but they are preferably formed coating a particle dispersion paste, in view of productivity.

<Porous Insulation Layer>

The porous insulation layer 133 has a function of retaining an electrolyte, as well as separating the first electrode layer 131 from the second electrode layer 134 to electrically insulate the first electrode layer 131 and the second electrode layer 134.

A material of the porous insulation layer 133 is not particularly limited, as long as it is porous. The material thereof is preferably an organic or inorganic material having high insulation properties and durability, and excellent film formability, and a composite material thereof.

As for a formation method of the porous insulation layer 133, for example, a sintering method (in which polymer particles or inorganic particles are partially fused to each other by adding a binder or the like, and pores formed between the particles are used) can be used.

As for a formation method of the porous insulation layer 133, for example, an extraction method (in which a layer is formed with a solvent-soluble organic or inorganic material, and a solvent-insoluble binder, followed by dissolving the organic or inorganic material with the solvent to thereby form fine pores) may be used.

As for a formation method of the porous insulation layer 133, a foaming method where a high molecular polymer is foamed by heating or degassing, a phase inversion method where a good solvent and a poor solvent are controlled to perform phase separation of a mixture of polymers, or a radiant ray irradiation method where any of various radiant rays are applied to form fine pores, may be used. Specific examples of the porous insulation layer include: a polymer-mixed particle film containing metal oxide particles (e.g., SiO$_2$ particles, and Al$_2$O$_3$ particles) and a polymer binder; a porous organic film (e.g., a polyurethane resin, and a polyethylene resin), and an inorganic insulation material film formed as a porous film.

The surface irregularities of the porous insulation layer 133 are depended on a thickness of the second electrode layer 134. When a thickness of the second electrode layer 134 is 100 nm, for example, the surface roughness of the porous insulation layer 133 is preferably the average roughness (Ra) of 100 nm or less. When the average roughness (Ra) thereof is greater than 100 nm, the surface resistance of the second electrode layer 134 is significantly lost, which may cause a display failure.

A thickness of the porous insulation layer 133 is appropriately selected depending on the intended purpose without any limitation, but the thickness thereof is preferably 0.5 μm to 2 μm.

The porous insulation layer 133 is preferably used in combination with an inorganic film. This is because a damage to the porous insulation layer 133 that is a layer below the second electrode layer 134, or an organic material of the electrochromic layer 132 can be reduced when the second electrode layer 134 is formed on a surface of the porous insulation layer 133 by sputtering.

As for the inorganic film, a material containing ZnS as well as SiO$_2$ is preferably used. The ZnS has characteristics that it can be formed into a film at high speed by sputtering without causing a damage on the electrochromic layer 132. Examples of a material containing the ZnS as a main component include ZnS—SiO$_2$, ZnS—SiC, ZnS—Si, and ZnS—Ge.

The ZnS content is preferably about 50 mol % to about 90 mol %, in order to maintain excellent crystallinity when an insulation layer is formed. Among them, more preferred are ZnS—SiO$_2$ (8/2), ZnS—SiO$_2$ (7/3), ZnS, and ZnS—ZnO—In$_2$O$_3$—Ga$_2$O$_3$ (60/23/10/7).

By using any of the aforementioned materials as the porous insulation layer 133, an excellent insulation effect can be attained with a thin film, and a reduction in the film strength, and pealing of the film can be prevented.

<Antidegradation Layer>

The antidegradation layer 135 is configured to carry out a chemical reaction (reverse reaction) opposite to that in the electrochromic layer 132, to balance the charge and prevent corrosion or deterioration of the first electrode layer 131 or the second electrode layer 134, which may be cause by an irreversible oxidation/reduction reaction. The antidegradation layer can improve repetitive stability of the electrochromic dimming lens 10. Note that, the reverse reaction includes to function as a capacitor, as well as oxidation and reduction of the antidegradation layer.

A material of the antidegradation layer 135 is appropriately selected depending on the intended purpose without any limitation, provided that it is configured to prevent corrosion of the first electrode layer 131 and the second electrode layer 134 caused by an irreversible oxidation/reduction reaction. As for the material thereof, for example, antimony-doped tin oxide, nickel oxide, titanium oxide, zinc oxide, tin oxide, or conductive or semiconductive metal oxide containing a plurality of the aforementioned materials. In the case where a tint of the antidegradation layer is not a problem, moreover, the material identical to any of the aforementioned electrochromic materials can be used.

The antidegradation layer 135 can be composed of a porous thin film, which does not adversely affect the injection of the electrolyte. For example, a preferable porous thin film that satisfies permeability of the electrolyte and a function as the antidegradation layer can be obtained by fixing conductive or semiconductive metal oxide particles (e.g., antimony-doped tin oxide, nickel oxide, titanium oxide, zinc oxide, and tin oxide) on the second electrode layer 34 with a binder (e.g., an acryl-based binder, an alkyd-based binder, an isocyanate-based binder, a urethane-based binder, an epoxy-based binder, and a phenol-based binder).

A material of the antidegradation layer 135 is appropriately selected depending on the intended purpose without any limitation, provided that it can create a transparent state with an exchange of the charge. Examples thereof include a conductive polymer (e.g., polypyrrole-based polymer, polythiophene-based polymer, polyaniline-based polymer, and derivatives thereof), a hybrid polymer of a metal complex and an organic ligand, and a radical polymer. When any of these material is used, it is necessary to adjust a film density, or form through holes by laser processing so as not to block the injection of the electrolyte. Alternatively, any of these materials is used as the electrochromic layer 132, and the aforementioned conductive or semiconductive particles bearing an organic electrochromic compound may be used as the antidegradation layer 135.

It is preferred that a transparent n-type semiconductive oxide particles (n-type semiconductive metal oxide) be used as the antidegradation layer 135. As a specific example, usable are particles of titanium oxide, tin oxide, zinc oxide, or a compound containing a plurality of the aforementioned materials, which are composed of particles having primary particle diameters of 100 nm or smaller, and a mixture containing any combination thereof.

In the case where any of these materials is used as the antidegradation layer 135, moreover, the electrochromic layer 132 is preferably a material that changes from a colored state to transparent as a result of an oxidation reaction. The n-type semiconductor metal oxide tends to be reduced (injected with electrons) at the same time when an oxidation reaction of the electrochromic layer 132 is carried out, and thus the driving voltage can be reduced.

In the embodiment as described, the particularly preferable electrochromic material is an organic polymer material. The organic polymer material can be easily formed into a film through a coating process, and use thereof can adjust or control a color with a molecular structure of the organic polymer material. Examples of the organic polymer material include a poly(3,4-ethylenedioxythiophene)-based material, and a polymer formed of a complex of bis(terpyridine) and iron ions.

As for a formation method of the antidegradation layer 135, for example, vacuum vapor deposition, sputtering, or ion plating. In the case where a material of the antidegradation layer 135 is coatable, a formation method of the antidegradation layer 135 is appropriately selected depending on the intended purpose without any limitation, and examples thereof include various printing methods, such as spin coating, casting, microgravure coating, gravure coating, bar coating, roller coating, wire bar coating, dip coating, slit coating, capillary coating, spray coating, nozzle coating, gravure printing, screen printing, flexo printing, offset printing, reverse printing, and inkjet printing.

<Electrolyte>

The electrolyte (not illustrated) is injected as an electrolytic solution into the porous insulation layer 133 provided between the first electrode layer 131 and the second electrode layer 134 from the fine through holes formed in the second electrode layer 134 through the antidegradation layer 135. Accordingly, the electrolyte (not illustrated) is loaded between the first electrode layer 131 and the second electrode layer 134 to be in contact with the electrochromic layer 132, and is provided in contact with the antidegradation layer 135 through the through holes formed in the second electrode layer 134.

As for the electrolytic solution, a solution prepared by dissolving a liquid electrolyte (e.g., an ionic liquid) or a solid electrolyte in a solvent is used.

As for a material of the electrolyte, for example, an inorganic ion salt (e.g., an alkali metal salt, and an alkaline earth metal salt), a quaternary ammonium salt, or an acid or alkaline supporting electrolyte can be used. Specific examples thereof include $LiClO_4$, $LiBF_4$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, and $Mg(BF_4)_2$. These may be used alone, or in combination.

The ionic liquid is not particularly limited, any material can be used as long as it is the material typically researched or reported.

Especially, an organic ionic liquid has a molecular structure with which it is present as a liquid in a wide temperature region including room temperature.

As for the molecular structure, examples of a cationic component thereof include: an aromatic salt, such as imidazole derivatives (e.g., N,N-dimethylimidazole salt, N,N-methylethylimidazole salt, and N,N-methylpropylimidazole salt), and pyridinium derivatives (e.g., N,N-dimethylpyridinium salt, and N,N-methylpropylpyridinium salt); and an aliphatic quaternary ammonium-based compound, such as tetraalkyl ammonium (e.g., trimethylpropyl ammonium salt, trimethylhexyl ammonium salt, and triethylhexyl ammonium salt). These may be used alone, or in combination.

As for the anionic component, a compound containing fluorine is preferable in view of the stability in the atmosphere. Examples thereof include $BF_4^-$, $CF_3SO_3^-$, $PF_4^-$, and $(CF_3SO_2)_2N^-$. The ionic liquid prepared with a combination of any of these cationic components and anionic component can be used.

Examples of the solvent include propylene carbonate, acetonitrile, γ-butyrolactone, ethylene carbonate, sulfolane, dioxolane, tetrahydrofuran, 2-methyltetrahydrofuran, dimethyl sulfoxide, 1,2-dimethoxyethane, 1,2-ethoxymethoxyethane, polyethylene glycol, and alcohol. These may be used alone, or in combination.

The electrolytic solution is not necessarily a low viscous liquid, and can be various embodiment, such as a gel, a crosslinked polymer, and a liquid crystal dispersion.

The electrolytic solution is preferably formed in a gel state or a solid state, in view of an improvement of strength of an element, an improvement of reliability, and prevention of color diffusion.

As for a method for solidifying, it is preferred that the electrolyte and a solvent are retained in a polymer resin. As a result of this, high ion conductivity and a solid strength can be attained.

Moreover, the polymer resin is preferably a photocurable resin, because use of the photocurable resin can achieve a production of an element at low temperature and for a short period, compared to a method for forming a thin film through thermal polymerization or evaporation of a solvent.

<Protective Layer>

The functions of the protective layer 136 are to protect the element from external forces, or chemicals used in washing processes, to prevent leakage of the electrolyte, and to prevent unnecessary matter for stably operating an electrochromic element, such as a moisture or oxygen in the atmosphere, from entering the element. At the same time, the protective layer requires transparency, surface smoothness, a refractive index, heat resistance, and light fastness so as not to impair the functions of the lens.

A thickness of the protective layer is appropriately selected depending on the intended purpose without any limitation, but the thickness thereof is preferably 1 μm to 200 μm.

As for a material of the protective layer, for example, an UV-ray curable resin, or thermoset resin can be used. Specific examples thereof include an acryl-based resin, a urethane-based resin, and an epoxy-based resin.

As for a formation method of the protective layer 36, for example, various film formation method, such as spin coating, dip coating, spray coating, and casting, can be used.

Note that, the electrochromic dimming lens 110 is optionally preferably equipped with a hard coat layer for preventing scratches, or an anti-reflection layer for suppressing reflections, in addition to the protective layer 136.

The preferable embodiment of the present invention has been specifically explained above, but the present invention is not limited to a certain embodiment. An embodiment of the present invention can be appropriately modified or changed within the scope specified in the claims.

EXAMPLES

Examples of the present invention are explained hereinafter, but these examples shall not be construed as to limit the scope of the present invention in any way Example 1

Production of Electrochromic Device

In Example 1, an example of a production of an electrochromic device 20 illustrated in FIG. 1 is depicted. Note that, the electrochromic device 20 produced in Example 1 can be also used as a dimming glass device.

—Formation of First Display Electrode—

First, an Ito film having a thickness of about 100 nm, and surface resistance of about 200 Ω/sq. was formed on a glass substrate in the size of 400 nm in length×400 nm in width, serving as a display substrate 21, through sputtering, to thereby form a first display electrode 22.

—Formation of First Electrochromic Layer—

Subsequently, a dispersion liquid of titanium oxide particles, in which aluminum hydroxide (amount of aluminium hydroxide: 7.7% by mass, the average particle diameter: 20 nm) was dispersed at inner parts and on surfaces thereof was applied onto the first display electrode 22 by spin coating. Thereafter, annealing was performed at 120° C. for 15 minutes to thereby partially bond the first display electrode 22 with the titanium oxide particles, and to partially bond the titanium oxide particles to each other. As a result, a titanium oxide particle film, in which aluminum hydroxide was dispersed in inner parts and on surfaces of the titanium oxide particles, was formed.

Subsequently, a 2,2,3,3-tetrafluoropropanol (referred to as "TFP") solution containing 1% by mass of 4,4'-(isooxazole-3,5-diyl)bis(1-(2-phosphonoethyl)pyridinium)bromide as an electrochromic compound was applied onto the titanium oxide particle film by spin coating, followed by performing annealing at 120° C. for 10 minutes. As a result, a first electrochromic layer 23 composed of the titanium oxide particle film and the electrochromic compound was formed.

Subsequently, an ethanol solution containing 0.1% by mass of poly-N-vinylamide, and an aqueous solution containing 0.5% by mass of polyvinyl alcohol were applied onto the first electrochromic layer 23 by spin coating, to thereby form a protective layer.

—Formation of First Insulation Layer—

A ZnS—$SiO_2$ film having a thickness of about 140 nm was formed on the protective layer by sputtering, to thereby form a first insulating layer 24. The composition ratio between ZnS and $SiO_2$ was 8:2.

—Formation of Second Display Electrode—

An ITO film having a thickness of about 100 nm and surface resistance of about 200 Ω/sq. was formed on the first insulation layer 24 by sputtering, to thereby form a second display electrode 25.

—Formation of Second Electrochromic Layer—

First, a dispersion liquid of titanium oxide particles, in inner parts and on surfaces of which aluminum hydroxide (amount of aluminium hydroxide: 7.7% by mass, the average particle diameter: 20 nm) was dispersed, was applied onto the second display electrode 25 by spin coating.

Subsequently, annealing was performed at 120° C. for 15 minutes to thereby partially bond the second display electrode 25 with the titanium oxide particles, and to partially bond the titanium oxide particles to each other. As a result, a titanium oxide particle film, in which aluminum hydroxide was dispersed in inner parts and on surfaces of the titanium oxide particles, was formed.

Subsequently, a TFP solution containing 1% by mass of 4,4'-(1-phenyl-1H-pyrrole-2,5-diyl)bis(1-(4-phosphonomethyl)benzyl)pyridinium)bromide as an electrochromic compound was applied onto the titanium oxide particle film by spin coating, followed by performing annealing at 120° C. for 10 minutes. As a result, a second electrochromic layer 26 composed of the titanium oxide particle film and the electrochromic compound was formed.

Subsequently, an ethanol solution containing 0.1% by mass of poly-N-vinylamide, and an aqueous solution containing 0.5% by mass of polyvinyl alcohol were applied onto the second electrochromic layer 26, to thereby form a protective layer.

—Formation of Second Insulation Layer—

A ZnS—$SiO_2$ film having a thickness of about 140 nm was formed on the protective layer by sputtering, to thereby form a second insulation layer 27. The composition ratio between ZnS and $SiO_2$ was 8:2.

—Formation of Third Display Electrode—

An ITO film having a thickness of about 100 nm and surface resistance of about 200 Ω/sq. was formed on the second insulation layer 27 by sputtering, to thereby form a third display electrode 28.

—Formation of Third Electrochromic Layer—

First, a dispersion liquid of titanium oxide particles, in inner parts and on surfaces of which aluminum hydroxide (amount of aluminium hydroxide: 7.7% by mass, the average particle diameter: 20 nm) was dispersed, was applied onto the third display electrode 28, by spin coating.

Subsequently, annealing was performed at 120° C. for 15 minutes to thereby partially bond the third display electrode 28 with the titanium oxide particles, and to partially bond the titanium oxide particles to each other. As a result, a titanium oxide particle film, in which aluminum hydroxide was dispersed in inner parts and on surfaces of the titanium oxide particles, was formed.

Subsequently, a TFP solution containing 1% by mass of 4,4'-(4,4'-(1,3,4-oxadiazole-2,5-diyl)bis(4,1-phenylene))bis (1-(8-phosphonooctyl)pyridinium)bromide as an electrochromic compound was applied onto the titanium oxide particle film by spin coating, followed by performing annealing at 120° C. for 10 minutes. As a result, a third electrochromic layer 29 composed of the titanium oxide particle film and the electrochromic compound was formed.

—Formation of White Reflection Layer—

First, a TFP dispersion liquid of titanium oxide particles, in inner parts and on surfaces of which aluminum hydroxide (amount of aluminium hydroxide: 8.5% by mass, the average particle diameter: 300 nm) was dispersed, and an aqueous polyurethane resin was applied onto the third electrochromic layer 29 by spin coating.

Subsequently, annealing was performed at 120° C. for 10 minutes. As a result, a white reflection layer 31 containing the titanium oxide particles, in the inner parts and on the surfaces of which aluminum hydroxide was dispersed, was formed.

Subsequently, the first display electrode 22, the second display electrode 25, the third display electrode 28, the first electrochromic layer 23, the second electrochromic layer 26, the third electrochromic layer 29, and the white reflection layer 31 were surrounded with a wall member 36 (see FIG. 1).

—Formation of Driving Element Layer—

In accordance with a conventional method, a driving element layer 34 containing a plurality of driving elements was formed on a glass substrate (40 mm in length×40 mm in width) serving as a counter substrate 35 in a manner that the pixel density was to be 140 ppi (pixels per inch).

—Formation of Counter Electrode—

An ITO film having a thickness of about 100 nm was formed on the counter substrate 35 by sputtering. Thereafter, a plurality of counter electrodes 35 were formed to correspond the driving elements contained in the driving element layer 34 through photolithography.

—Formation of Charge Retention Layer—

A charge retention layer 32 was formed by mixing a polymer material and a particulate material, dispersing the mixture in a dispersion medium, and applying the resulting mixed material onto the driving element layer 34 and the counter electrode 33 by spin coating.

Specifically, a TFP dispersion liquid of an aqueous polyurethane resin and ATO particles was applied on the driving element layer 34 and the counter electrode 35 by spin coating. Thereafter, annealing was performed at 120° C. for 15 minutes, to thereby form a charge retention layer 32 having a thickness of about 640 nm, and surface resistance of about 1.0E+06 Ω/sq. A mass ratio of the aqueous polyurethane resin to ATO was 55% by mass:45% by mass.

—Bonding—

The counter substrate 35 to which the layers up to the charge retention layer 32 had been formed (the layers 34, 33, 32 had been formed), and the display substrate 21 to which the layers up to the white reflection layer 31 had been formed (the layers 22, 23, 24, 25, 26, 27, 28, 29, 31 had been formed) were bonded to together with an electrolyte being between them in the manner that the counter electrode and the display electrode faced each other.

Specifically, a precursor material of the electrolyte prepared in the following manner was injected from the upper part of the white reflection layer 31 into the display substrate 21 surrounded with the wall member 36. Subsequently, the injection port was sealed, to thereby bond the display substrate 21 with the counter substrate 35. Thereafter, ultraviolet rays having the center wavelength of 365 nm, and the light intensity of 50 mW/cm$^2$ was applied for 2 minutes by a high pressure mercury lamp to the resultant from the side of the counter electrode, to thereby form an electrolyte layer 30 between the both substrates. In the manner as described above, the electrochromic display element of Example 1 was produced.

[Preparation of Precursor of Electrolyte]

As a preparation of a precursor material of the electrolyte layer 30, first, a propylene carbonate solution of tetrabutyl ammonium perchlorate (TBAP) was adjusted to have the TBAP molar concentration of about 2.0 mol/l. Subsequently, a mixture containing a liquid crystal composition for polymer network liquid crystal (PNLC), a monomer composition, and a polymerization initiator was added to the resulting solution. Thereafter, the TBAP molar concentration of the propylene carbonate solution was again adjusted to be about 0.04 mol/l. Subsequently, spherical resin beads having particle diameters of 10 μm were dispersed in the propylene carbonate solution at the concentration of 0.2% by mass in order to specify a thickness of an electrolyte layer 30 to be produced, to thereby obtain the precursor material of the electrolyte layer 30.

Subsequently, light fastness of the produced electrochromic display element of Example 1 was evaluated by measuring a color difference retention rate in the following manner. Moreover, the coloring voltage and discharging voltage were measured in the following manner. These results are presented in Table 1.

<Evaluation of Light Fastness of Electrochromic Display Element>

A color difference retention rate was calculated based on a color difference $\Delta E\_\alpha$ before applying light to the electrochromic display element, and a color difference $\Delta E\_\beta$ after applying light to the electrochromic display element. The light irradiation was performed by light of a white fluorescent lamp containing a UV component was applied to the electrochromic display element, which was a target of the measurement, at the illuminance of 15,000 Lx, for 100 hours.

The color difference ΔE was calculated in the following manner. First, a difference in the coloring density between the electrochromic display element of the measuring target in the state where it was completely discharged, and the electrochromic display element of the measuring target in the state where the electrochromic layer was colored, by means of a spectrophotometer (CM3700d, manufactured by Konica Minolta, Inc.).

The color difference ΔE was calculated corresponding to the coordinates of the two values represented by the CIE Lab color space (L*a*b* color space), and was used as an index for the coloring density. The color difference retention rate (%) was calculated by dividing the color difference ΔE_β by the color difference ΔE_α, where the color difference ΔE_β was the color difference after the light irradiation, and the color difference ΔE_α was the color difference before the light irradiation.

Note that, the CIE Lab color space is a color system where a color is represented with coordinates on a uniform color space composed of lightness L* and chromatic numbers a*, b*, and defines a calculation formula based on color senses of human eyes.

The color difference ΔE_α before the light irradiation was 54.6.

The color difference ΔE_β after the light irradiation was 48.9.

Specifically, in the case where the titanium oxide particles, in the inner parts and on the surfaces of which aluminum hydroxide was dispersed were used as the titanium oxide particles contained in the white reflection layer and the electrochromic layer, the color difference retention rate of the electrochromic display element that had been subjected to the light irradiation was 89.6%. It was confirmed from this result that the electrochromic display element of Example 1 had excellent light fastness.

<Coloring Voltage and Discharging Voltage>

The voltages required for coloring and discharging were measured by ModuLab of Solartron Analytical. As a result, the coloring voltage was 2.6 V, and the discharging voltage was 0.9 V.

Example 2

Production of Electrochromic Device

An electrochromic display element illustrated in FIG. 1 was produced in the same manner as in Example 1, provided that titanium oxide particles having the average particle diameter of 300 nm and free from aluminum hydroxide were used as the titanium oxide particles contained in the white reflection layer.

Subsequently, light fastness of the produced electrochromic display element of Example 2 was evaluated in the same manner as in Example 1, by measuring a color difference retention rate. Moreover, the coloring voltage and discharging voltage were measured in the same manner as in Example 1. These results are presented in Table 1.

<Evaluation of Light Fastness of Electrochromic Display Element>

The color difference ΔE_α before the light irradiation was 54.9.

The color difference ΔE_β after the light irradiation was 35.9.

Specifically, in the case where the titanium oxide particles, in the inner parts and on the surfaces of which aluminum hydroxide was dispersed were used as the titanium oxide particles contained in the electrochromic layer, and the titanium oxide particles that did not contain aluminum hydroxide were used as the titanium oxide particles contained in the white reflection layer, the color difference retention rate of the electrochromic display element that had been subjected to the light irradiation was 65.4%. It was confirmed from this result that the electrochromic display element of Example 2 had light fastness that was slightly lower than that of the electrochromic display element of Example 1.

<Coloring Voltage and Discharging Voltage>

The voltages required for coloring and discharging were measured in the same manner as in Example 1. As a result, the coloring voltage was 2.6 V, and the discharging voltage was 0.9 V.

Example 3

Production of Electrochromic Device

An electrochromic display element illustrated in FIG. 1 was produced in the same manner as in Example 1, provided that titanium oxide particles having the average particle diameter of 20 nm and free from aluminum hydroxide were used as the titanium oxide particles contained in the electrochromic layer.

Subsequently, light fastness of the produced electrochromic display element of Example 3 was evaluated in the same manner as in Example 1, by measuring a color difference retention rate. Moreover, the coloring voltage and discharging voltage were measured in the same manner as in Example 1. These results are presented in Table 1.

<Evaluation of Light Fastness of Electrochromic Display Element>

The color difference ΔE_α before the light irradiation was 52.8.

The color difference ΔE_β after the light irradiation was 23.7.

Specifically, in the case where the titanium oxide particles, in the inner parts and on the surfaces of which aluminum hydroxide was dispersed, were used as the titanium oxide particles contained in the white reflection layer, and the titanium oxide particles that did not contain aluminum hydroxide were used as the titanium oxide particles contained in the electrochromic layer, the color difference retention rate of the electrochromic display element that had been subjected to the light irradiation was 44.9%. It was confirmed from this result that the light fastness was enhanced in the case where the titanium oxide particles in the inner parts and on the surfaces of which aluminum hydroxide was dispersed were used as the titanium oxide particles contained in the electrochromic layer, compared to the case where the titanium oxide particles in the inner parts and on the surfaces of which aluminum hydroxide was dispersed were used as the titanium oxide particles contained in the white reflection layer.

<Coloring Voltage and Discharging Voltage>

The voltages required for coloring and discharging were measured in the same manner as in Example 1. As a result, the coloring voltage was 2.6 V, and the discharging voltage was 0.9 V.

Example 4

Production of Electrochromic Device

An electrochromic display element illustrated in FIG. 1 was produced in the same manner as in Example 1, provided that the titanium oxide particles contained in the electrochromic layer were replaced with titanium oxide particles, in inner parts and on surfaces of which iron (III) hydroxide was dispersed, where the average particle diameter of the titanium oxide particles was 20 nm, and the amount of the iron (III) hydroxide in the titanium oxide particles was 8.5%, and the titanium oxide particles contained in the white reflection layer were replaced with titanium oxide particles, in inner parts and on surfaces of which iron (III) hydroxide was dispersed, where the average particle diameter of the titanium oxide particles was 300 nm, and the amount of the iron (III) hydroxide in the titanium oxide particles was 9.1%.

Subsequently, light fastness of the produced electrochromic display element of Example 4 was evaluated in the same manner as in Example 1, by measuring a color difference retention rate. Moreover, the coloring voltage and discharging voltage were measured in the same manner as in Example 1. These results are presented in Table 1, and below.

<Evaluation of Light Fastness of Electrochromic Display Element>

The color difference $\Delta E\_\alpha$ before the light irradiation was 55.0.

The color difference $\Delta E\_\beta$ after the light irradiation was 40.8.

Specifically, in the case where the titanium oxide particles, in the inner parts and on the surfaces of which iron (III) hydroxide was dispersed, were used as the titanium oxide particles contained in the white reflection layer and the electrochromic layer, the color difference retention rate of the electrochromic display element that had been subjected to the light irradiation was 74.2%. It was found from this result that the electrochromic display element had excellent light fastness in the case where the titanium oxide particles containing the iron (III) hydroxide dispersed herein were used, through the light fastness thereof was lower than that of the electrochromic display element in the case where the titanium oxide particles in the inner parts and the surfaces of which aluminum hydroxide was dispersed were used as the titanium oxide particles contained in the white reflection layer, and the electrochromic layer. Moreover, it was confirmed that the aluminium hydroxide had the larger effect of suppressing the photocatalystic activities of the titanium oxide compared to the ion (III) hydroxide.

<Coloring Voltage and Discharging Voltage>

The voltages required for coloring and discharging were measured in the same manner as in Example 1. As a result, the coloring voltage was 2.6 V, and the discharging voltage was 0.9 V.

Comparative Example 1

Production of Electrochromic Device

An electrochromic display element illustrated in FIG. 1 was produced in the same manner as in Example 1, provided that titanium oxide particles, in inner parts and on surfaces of which metal hydroxide was not dispersed at all, were used as the titanium oxide particles contained in the white reflection layer and the electrochromic layer.

Subsequently, light fastness of the produced electrochromic display element of Comparative Example 1 was evaluated in the same manner as in Example 1, by measuring a color difference retention rate. Moreover, the coloring voltage and discharging voltage were measured in the same manner as in Example 1. These results are presented in Table 1, and below.

<Evaluation of Light Fastness of Electrochromic Display Element>

The color difference $\Delta E\_\alpha$ before the light irradiation was 55.1.

The color difference $\Delta E\_\beta$ after the light irradiation was 9.9.

Specifically, in the case where the titanium oxide particles, in the inner parts and on the surfaces of which aluminum hydroxide was not dispersed at all, were used as the titanium oxide particles contained in the white reflection layer and the electrochromic layer, the color difference retention rate of the electrochromic display element that had been subjected to the light irradiation was 18.0%. It was confirmed from this result that the light fastness of the electrochromic display element was extremely poor.

<Coloring Voltage and Discharging Voltage>

The voltages required for coloring and discharging were measured in the same manner as in Example 1. As a result, the coloring voltage was 2.5 V, and the discharging voltage was 0.8 V.

It was confirmed from this result that the voltages required for coloring and discharging increased in the case where the titanium oxide particles, in the inner parts and on the surfaces of which metal hydroxide was dispersed, were used as the titanium oxide particles contained in the white reflection layer and the electrochromic layer, compared to the case where the titanium oxide particles, in the inner parts and on the surfaces of which metal hydroxide was not dispersed at all, were used, but the increased value was only small.

Comparative Example 2

Production of Electrochromic Device

An electrochromic display element illustrated in FIG. 1 was produced in the same manner as in Example 1, provided that titanium oxide particles surfaces of which were covered (thickness: 2 nm) with aluminum hydroxide (amount of aluminium hydroxide: 38% by mass [in the titanium oxide particles having the average particle diameter of 20 nm contained in the electrochromic layer], amount of aluminum hydroxide: 2.4% by mass [in the titanium oxide particles having the average particle diameter of 300 nm contained in the white reflection layer]) were used as the titanium oxide particles contained in the white reflection layer and the electrochromic layer.

Subsequently, light fastness of the produced electrochromic display element of Comparative Example 2 was evaluated in the same manner as in Example 1, by measuring a color difference retention rate. Moreover, the coloring voltage and discharging voltage were measured in the same manner as in Example 1. These results are presented in Table 1, and below.

<Evaluation of Light Fastness of Electrochromic Display Element>

The color difference $\Delta E\_\alpha$ before the light irradiation was 55.0.

The color difference $\Delta E\_\beta$ after the light irradiation was 50.4.

Specifically, in the case where the titanium oxide particles surfaces of which were covered with the 2 nm-thick aluminum hydroxide were used as the titanium oxide particles contained in the white reflection layer and the electrochromic layer, the color difference retention rate of the electrochromic display element that had been subjected to the light irradiation was 91.6%. It was confirmed from this result that the light fastness of the electrochromic display element was extremely excellent.

<Coloring Voltage and Discharging Voltage>

The voltages required for coloring and discharging were measured in the same manner as in Example 1. As a result, the coloring voltage was 3.8 V, and the discharging voltage was 2.0 V. It was confirmed from this result that the electrochromic display element of Comparative Example 2 had significantly high coloring voltage and discharging voltage compared to those of the electrochromic display element of Example 1. The increase in the voltages required for coloring and discharging directly connect to a driving damage to various elements constituting the electrochromic display element, as well as increasing the electricity consumption. Therefore, it is concerned that such an increase may become a factor for imparting the driving durability and service life of the electrochromic display element.

TABLE 1

| | | Ex. 1 | Ex. 2 | Ex. 3 | Ex. 4 |
|---|---|---|---|---|---|
| Electrochromic layer | Titanium oxide particles | Titanium oxide particles with aluminium hydroxide in inner parts and on surfaces thereof | Titanium oxide particles with aluminium hydroxide in inner parts and on surfaces thereof | Titanium oxide particles | Titanium oxide particles with iron (III) hydroxide in inner parts and on surfaces thereof |
| | Amount of metal hydroxide (mass %) | 7.7 | 7.7 | 0 | 8.5 |
| | Average particle diameter (nm) | 20 | 20 | 20 | 20 |
| White reflection layer | Titanium oxide particles | Titanium oxide particles with aluminium hydroxide in inner parts and on surfaces thereof | Titanium oxide particles | Titanium oxide particles with aluminium hydroxide in inner parts and on surfaces thereof | Titanium oxide particles with iron (III) hydroxide in inner parts and on surfaces thereof |
| | Amount of metal hydroxide (mass %) | 8.5 | 0 | 8.5 | 9.1 |
| | Average particle diameter (nm) | 300 | 300 | 300 | 300 |
| Evaluation results | $\Delta E\_\alpha$ before light irradiation | 54.6 | 54.9 | 52.8 | 55.0 |
| | $\Delta E\_\beta$ after light irradiation | 48.9 | 35.9 | 23.7 | 40.8 |
| | Color difference retention rate (%) | 89.6 | 65.4 | 44.9 | 74.2 |
| | Coloring voltage (V) | 2.6 | 2.6 | 2.6 | 2.6 |
| | Discharging voltage (V) | 0.9 | 0.9 | 0.9 | 0.9 |

| | | Comp. Ex. 1 | Comp. Ex. 2 |
|---|---|---|---|
| Electrochromic layer | Titanium oxide particles | Titanium oxide | Titanium oxide particles with aluminium hydroxide on surfaces thereof |
| | Amount of metal hydroxide (mass %) | 0 | 38 (2 nm coating) |
| | Average particle diameter (nm) | 20 | 20 |
| White reflection layer | Titanium oxide particles | Titanium oxide particles | Titanium oxide particles with aluminium hydroxide on surfaces thereof |
| | Amount of metal hydroxide (mass %) | 0 | 2.4 (2 nm coating) |
| | Average particle diameter (nm) | 300 | 300 |
| Evaluation results | $\Delta E\_\alpha$ before light irradiation | 55.1 | 55.0 |
| | $\Delta E\_\beta$ after light irradiation | 9.9 | 50.4 |
| | Color difference retention rate (%) | 18.0 | 91.6 |
| | Coloring voltage (V) | 2.5 | 3.8 |
| | Discharging voltage (V) | 0.8 | 2.0 |

It was confirmed from the results depicted in Table 1 that the light fastness of the electrochromic display element was effectively improved without increasing the voltage required for coloring and discharging, by using the titanium oxide particles, in the inner parts and on the surfaces of which aluminum hydroxide was dispersed, were used as the titanium oxide particles contained in the white reflection layer, or the electrochromic layer, or both.

Example 5

Production of Electrochromic Dimming Lens

In Example 5, an example of a production of an electrochromic dimming lens 10 illustrated in FIG. 6 is depicted.
—Formation of First Electrode Layer—
First, a lens having a diameter of 65 mm was provided. An ITO film having a thickness of about 100 nm was formed on the 25 mm×45 mm region, and an extraction part of the lens by sputtering through a metal mask, to thereby form a first electrode layer 131.
—Formation of Electrochromic Layer—
Subsequently, a dispersion liquid of titanium oxide particles (the average particle diameter: 20 nm, amount of aluminium hydroxide: 7.7% by mass), in inner parts and on surfaces of which aluminium hydroxide was dispersed, was applied onto a surface of the ITO film by spin coating. Then, annealing was performed at 120° C. for 5 minutes, to thereby form a nano-structure semiconductor material composed of a titanium oxide particle film having a thickness of about 1.0 μm.

Subsequently, a 2,2,3,3-tetrafluoropropanol solution containing 1.5% by mass of the compound represented by the following structural formula A as an electrochromic compound was applied, followed by performing annealing at 120° C. for 10 minutes, to thereby form an electrochromic layer 132 born (adsorbed) on the titanium oxide particle film.

<Structural Formula A>

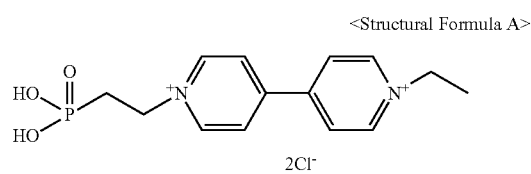 [SMILES: CC[n+]1ccc(-c2cc[n+](CCP(=O)(O)O)cc2)cc1]

2Cl⁻

—Formation of Porous Insulation Layer and Second Electrode Layer with Through-Holes—
Subsequently, a dispersion liquid of SiO₂ particles having the average primary particle diameter of 20 nm (silica solid content: 24.8% by mass, polyvinyl alcohol: 1.2% by mass, and water: 74% by mass) was applied onto the electrochromic layer 132 by spin coating, to thereby produce a porous insulation layer. A thickness of the formed porous insulation layer 133 was about 2 μm.

Subsequently, a dispersion liquid of SiO₂ particles having the average primary particle diameter of 450 nm (silica solid content: 1% by mass, and 2-propanol 99% by mass) was applied on the porous insulation layer by spin coating, to thereby form a mask (colloidal mask) for forming fine through holes.

Subsequently, on the mask for forming fine through holes, an inorganic insulation layer of ZnS—SiO₂ (molar ratio=8/2) was formed in the thickness of 40 nm by sputtering.

Subsequently, an ITO film having a thickness of about 100 nm was formed on the 25 mm×45 mm region of the inorganic insulation layer, which was overlapped with the region where the ITO film was formed in the first electrode layer 131, and the region of the inorganic insulation layer, which was not overlapped with the first electrode layer 131, by sputtering through a metal mask, to thereby form a second electrode layer 134. Note that, the ITO film formed on the region which was not overlapped with the first electrode layer 131 was an extraction part of the second electrode layer 134.

Thereafter, ultrasonic irradiation was performed in 2-propanol for 3 minutes, to remove the SiO₂ particles of 450 nm, which was the colloidal mask. It was confirmed from the SEM observation that the second electrode layer 134, in which fine through holes in the size of about 250 nm were formed, was formed. The sheet resistance of the second electrode layer 134 was about 100 Ω/sq.
—Formation of Antidegradation Layer—
Subsequently, a dispersion liquid of antimony-doped tin oxide particles was applied as an antidegradation layer 135 on the second electrode layer 134 by spin coating. Then, annealing was performed at 120° C. for 15 minutes, to thereby form a nano-structure semiconductor material (antidegradation layer) composed of an antimony-doped tin oxide particle film having a thickness of about 1.0 μm.
—Filling of Electrolyte—
Subsequently, tetrabutyl ammonium perchlorate as an electrolyte, and dimethyl sulfoxide and polyethylene glycol (average molecular weight: 200) as solvents were blended at 12:54:60 (mass ratio), to thereby prepare a solution, which was provided as an electrolytic solution.

Subsequently, the element to which the layers up to the antidegradation layer 135 had been formed was immersed in the electrolytic solution for 1 minute, followed by drying the element on a hot plate at 120° C. for 1 minute, to fill with an electrolyte.
—Formation of Protective Layer—
Subsequently, a UV ray-curable adhesive (product name: SD-17, manufactured by DIC Corporation) was applied onto the electrolyte by spin coating, followed by applying UV light to cure the adhesive, to thereby form a protective layer 136 having a thickness of about 3 μm. In the manner as described above, an electrochromic dimming lens 110 illustrated in FIG. 6 was produced.

Subsequently, light fastness of the produced electrochromic dimming lens of Example 5 was evaluated in the same manner as in Example 1, by measuring a color difference retention rate. Moreover, the coloring voltage and discharging voltage were measured in the same manner as in Example 1. These results are presented in Table 2, and below.
<Evaluation of Light Fastness of Electrochromic Dimming Lens>
The color difference ΔE_α before the light irradiation was 52.1.
The color difference ΔE_β after the light irradiation was 36.9.
Specifically, in the case where the titanium oxide particles, in the inner parts and on the surfaces of which aluminium hydroxide was dispersed were used as the titanium oxide particles contained in the electrochromic layer, the color difference retention rate of the electrochromic dimming lens that had been subjected to the light irradiation was 70.8%.

<Coloring Voltage and Discharging Voltage>

The voltages required for coloring and discharging were measured in the same manner as in Example 1. As a result, the coloring voltage was 2.1 V, and the discharging voltage was 0.5 V.

Comparative Example 3

An electrochromic dimming lens 110 illustrated in FIG. 6 was produced in the same manner as in Example 5, provided that titanium oxide particles (average particle diameter: about 20 nm), in inner parts and on surfaces of which metal hydroxide was not dispersed at all were used as the titanium oxide particles contained in the electrochromic layer.

Subsequently, light fastness of the produced electrochromic dimming lens of Comparative Example 3 was evaluated in the same manner as in Example 1, by measuring a color difference retention rate. Moreover, the coloring voltage and discharging voltage were measured in the same manner as in Example 1. These results are presented in Table 2, and below.

<Evaluation of Light Fastness of Electrochromic Dimming Lens>

The color difference $\Delta E\_\alpha$ before the light irradiation was 53.5.

The color difference $\Delta E\_\beta$ after the light irradiation was 9.3.

Specifically, in the case where the titanium oxide particles, in the inner parts and on the surfaces of which metal hydroxide was not dispersed at all, were used in the electrochromic layer, the color difference retention rate of the electrochromic dimming lens that had been subjected to the light irradiation was 17.4%.

<Coloring Voltage and Discharging Voltage>

The voltages required for coloring and discharging were measured in the same manner as in Example 1. As a result, the coloring voltage was 2.0 V, and the discharging voltage was 0.4 V.

Comparative Example 4

An electrochromic dimming lens 110 illustrated in FIG. 6 was produced in the same manner as in Example 5, provided that titanium oxide particles (average particle diameter: about 20, amount of aluminium hydroxide: 38% by mass), each surface of which was covered with about 2 nm-thick aluminium hydroxide, were used as the titanium oxide particles contained in the electrochromic layer.

Subsequently, light fastness of the produced electrochromic dimming lens of Comparative Example 4 was evaluated in the same manner as in Example 1, by measuring a color difference retention rate. Moreover, the coloring voltage and discharging voltage were measured in the same manner as in Example 1. These results are presented in Table 2, and below.

<Evaluation of Light Fastness of Electrochromic Dimming Lens>

The color difference $\Delta E\_\alpha$ before the light irradiation was 53.7.

The color difference $\Delta E\_\beta$ after the light irradiation was 43.4.

Specifically, in the case where the titanium oxide particles, each surface of which was covered with aluminium hydroxide, were used in the electrochromic layer, the color difference retention rate of the electrochromic dimming lens that had been subjected to the light irradiation was 80.8%.

<Coloring Voltage and Discharging Voltage>

The voltages required for coloring and discharging were measured in the same manner as in Example 1. As a result, the coloring voltage was 3.2 V, and the discharging voltage was 1.4 V.

TABLE 2

|  |  | Ex. 5 | Comp. Ex. 3 | Comp. Ex. 4 |
|---|---|---|---|---|
| Electrochromic layer | Titanium oxide particles | Titanium oxide particles with aluminium hydroxide in the inner parts and on surfaces thereof | Titanium oxide particles | Titanium oxide particles with aluminium hydroxide on surfaces thereof |
|  | Amount of metal hydroxide (mass %) | 7.7 | 0 | 38 (2 nm coating) |
|  | Average particle diameter(nm) | 20 | 20 | 20 |
| Evaluation results | $\Delta E\_\alpha$ before light irradiation | 52.1 | 53.5 | 53.7 |
|  | $\Delta E\_\beta$ after light irradiation | 36.9 | 9.3 | 43.4 |
|  | Color difference retention rate (%) | 70.8 | 17.4 | 80.8 |
|  | Coloring voltage (V) | 2.1 | 2.0 | 3.2 |
|  | Discharging voltage (V) | 0.5 | 0.4 | 1.4 |

As explained above, it was found that the present invention could realize an electrochromic display element and electrochromic dimming lens, which had excellent light fastness, and coloring and discharging properties, without increasing the voltages required for coloring and discharging, by using titanium oxide particles, in inner parts and on surfaces of which metal hydroxide was dispersed, as titanium oxide particles contained in an electrochromic layer.

The embodiments of the present invention are, for example, as follows:

<1> An electrochromic display element, containing:
 a display substrate;
 a display electrode;
 an electrochromic layer provided in contact with the display electrode;
 a counter substrate provided to face the display substrate;
 a counter electrode;
 a charge retention layer provided in contact with the counter electrode; and
 an electrolyte layer filling between the display substrate and the counter substrate, wherein the electrochromic layer contains titanium oxide particles, and metal hydroxide is dispersed on surfaces and in inner parts of the titanium oxide particles.

<2> An electrochromic display element, containing:
a display substrate;
a display electrode;
an electrochromic layer provided in contact with the display electrode;
a counter substrate provided to face the display substrate;
a counter electrode;
a charge retention layer provided in contact with the counter electrode;
a white reflection layer provided between the electrochromic layer and the charge retention layer; and
an electrolyte layer filling between the display substrate and the counter substrate,
wherein the electrochromic layer and the white reflection layer both contain titanium oxide particles, and metal hydroxide is dispersed on surfaces and in inner parts of the titanium oxide particles.

<3> The electrochromic display element according to <1> or <2>, wherein the metal hydroxide is aluminium hydroxide.

<4> The electrochromic display element according to any one of <1> to <3>, wherein an amount of the metal hydroxide in the titanium oxide particles is 3% by mass to 15% by mass.

<5> A display device, containing:
the electrochromic display element according to any one of <1> to <4>;
a first memory unit configured to store display data; and
a display controller configured to control the electrochromic display element according to the display data.

<6> Information equipment, containing:
the display device according to <5>; and
a controlling device configured to control information to be displayed on the display device.

<7> A method for producing an electrochromic display element, containing:
forming a display electrode on a display substrate;
forming an electrochromic layer on the display electrode, where the electrochromic layer contains titanium oxide particles, on surfaces and in inner parts of which metal hydroxide is dispersed;
forming a counter electrode on a counter substrate;
forming a charge retention layer on the counter electrode; and
bonding the display substrate and the counter substrate together with an electrolyte layer being between the display substrate and the counter substrate.

<8> A method for producing an electrochromic display element, containing:
forming a display electrode on a display substrate;
forming an electrochromic layer on the display electrode, where the electrochromic layer contains titanium oxide particles, on surfaces and in inner parts of which metal hydroxide is dispersed;
forming a white reflection layer on the electrochromic layer, where the white reflection layer contains titanium oxide particles, on surfaces and in inner parts of which metal hydroxide is dispersed;
forming a driving element layer on a counter substrate;
forming a counter electrode on the driving element layer;
forming a charge retention layer on the counter electrode; and
bonding the display substrate and the counter substrate together with an electrolyte layer being between the display substrate and the counter substrate.

<9> A method for producing an electrochromic display element, containing:
forming a first display electrode on a display substrate;
forming a first electrochromic layer on the first display electrode, where the first electrochromic layer contains titanium oxide particles, on surfaces and in inner parts of which metal hydroxide is dispersed;
forming a first insulation layer on the first electrochromic layer;
forming a second display electrode on the first insulation layer;
forming a second electrochromic layer on the second display electrode, where the second electrochromic layer contains titanium oxide particles, on surfaces and in inner parts of which metal hydroxide is dispersed;
forming a second insulation layer on the second electrochromic layer;
forming a third display electrode on the second insulation layer;
forming a third electrochromic layer on the third display electrode, where the third electrochromic layer contains titanium oxide particles, on surfaces and in inner parts of which metal hydroxide is dispersed;
forming a white reflection layer on the third electrochromic layer, where the white reflection layer contains titanium oxide particles, on surfaces and in inner parts of which metal hydroxide is dispersed;
forming a driving element layer on a counter substrate;
forming a counter electrode on the driving element layer;
forming a charge retention layer on the counter electrode; and
bonding the display substrate and the counter substrate together with an electrolyte layer being between the display substrate and the counter substrate.

<10> An electrochromic dimming lens, containing:
a lens;
a first electrode layer laminated on the lens;
an electrochromic layer laminated on the first electrode layer;
a porous insulation layer laminated on the electrochromic layer;
a second electrode layer, which is porous, and is laminated on the porous insulation layer;
an antidegradation layer provided in contact with the second electrode layer, and provided at an upper side, or a bottom side, or both sides of the second electrode layer; and
an electrolyte layer filling between the first electrode layer and the second electrode layer, and provided in contact with the electrochromic layer and the antidegradation layer,
wherein the electrochromic layer contains titanium oxide particles, and metal hydroxide is dispersed on surfaces and in inner parts of the titanium oxide particles.

<11> An electrochromic dimming lens, containing:
a lens;
a first electrode layer laminated on the lens;
an antidegradation layer laminated on the first electrode layer;
a porous insulation layer laminated on the antidegradation layer;
a second electrode layer, which is porous, and is laminated on the porous insulation layer;
an electrochromic layer provided in contact with the second electrode layer, and provided at an upper side, or a bottom side, or both sides of the second electrode layer; and
an electrolyte layer filling between the first electrode layer and the second electrode layer, and provided in contact with the antidegradation layer and the electrochromic layer, wherein the electrochromic layer contains titanium oxide particles, and metal hydroxide is dispersed on surfaces and in inner parts of the titanium oxide particles.

<12> The electrochromic dimming lens according to <10> or <11>, wherein the metal hydroxide is aluminium hydroxide.

<13> The electrochromic dimming lens according to any one of <10> to <12>, wherein an amount of the metal hydroxide in the titanium oxide particles is 3% by mass to 15% by mass.

This application claims priority to Japanese application No. 2014-099540, filed on May 13, 2012 and incorporated herein by reference.

What is claimed is:

1. An electrochromic display element, comprising:
   a display substrate;
   a display electrode;
   an electrochromic layer provided in contact with the display electrode;
   a counter substrate provided to face the display substrate;
   a counter electrode;
   a charge retention layer provided in contact with the counter electrode; and
   an electrolyte layer filling between the display substrate and the counter substrate,
   wherein the electrochromic layer contains an electrochromic compound and titanium oxide particles, and single molecules of the electrochromic compound are adsorbed onto the titanium oxide particles, and
   wherein aluminum hydroxide is dispersed on surfaces and in inner parts of the titanium oxide particles.

2. An electrochromic display element, comprising:
   a display substrate;
   a display electrode;
   an electrochromic layer provided in contact with the display electrode;
   a counter substrate provided to face the display substrate;
   a counter electrode;
   a charge retention layer provided in contact with the counter electrode;
   a white reflection layer provided between the electrochromic layer and the charge retention layer; and
   an electrolyte layer filling between the display substrate and the counter substrate,
   wherein the electrochromic layer contains an electrochromic compound and the electrochromic layer and the white reflection layer both contain titanium oxide particles, and single molecules of the electrochromic compound are adsorbed onto the titanium oxide particles, and
   wherein aluminum hydroxide is dispersed on surfaces and in inner parts of the titanium oxide particles.

3. The electrochromic display element according to claim 1, wherein an amount of the aluminum hydroxide in the titanium oxide particles is 3% by mass to 15% by mass.

4. The electrochromic display element according to claim 2, wherein an amount of the aluminum hydroxide in the titanium oxide particles is 3% by mass to 15% by mass.

5. A display device, comprising:
   the electrochromic display element according to claim 1;
   a first memory unit configured to store display data; and
   a display controller configured to control the electrochromic display element according to the display data.

6. A display device, comprising:
   the electrochromic display element according to claim 2;
   a first memory unit configured to store display data; and
   a display controller configured to control the electrochromic display element according to the display data.

7. Information equipment, comprising:
   the display device according to claim 5; and
   a controller configured to control information to be displayed on the display device.

8. Information equipment, comprising:
   the display device according to claim 6; and
   a controller configured to control information to be displayed on the display device.

9. An electrochromic dimming lens, comprising:
   a lens;
   a first electrode layer laminated on the lens;
   an electrochromic layer laminated on the first electrode layer;
   a porous insulation layer laminated on the electrochromic layer;
   a second electrode layer, which is porous, and is laminated on the porous insulation layer;
   an antidegradation layer provided in contact with the second electrode layer, and provided at an upper side, or a bottom side, or both sides of the second electrode layer; and
   an electrolyte layer filling between the first electrode layer and the second electrode layer, and provided in contact with the electrochromic layer and the antidegradation layer,
   wherein the electrochromic layer contains an electrochromic compound and titanium oxide particles, and single molecules of the electrochromic compound are adsorbed onto the titanium oxide particles, and
   wherein aluminum hydroxide is dispersed on surfaces and in inner parts of the titanium oxide particles.

10. The electrochromic dimming lens according to claim 9, wherein an amount of the aluminum hydroxide in the titanium oxide particles is 3% by mass to 15% by mass.

* * * * *